United States Patent
Hirata et al.

[19]

[11] Patent Number: 6,125,885
[45] Date of Patent: Oct. 3, 2000

[54] ROTARY CHANNEL-SELECTOR VALVE

[75] Inventors: Kazuo Hirata; Toshihiro Teranishi; Mitsuaki Noda; Mitsuo Sugita; Michiaki Ohno; Fumio Kanasaki; Noboru Nakagawa; Kazunori Aihara; Kazushige Suzuki, all of Saitama, Japan

[73] Assignee: Kabushiki Kaisha Saginomiya Seisakusho, Tokyo, Japan

[21] Appl. No.: 09/184,889

[22] Filed: Nov. 3, 1998

[30] Foreign Application Priority Data

Nov. 5, 1997 [JP] Japan .................................... 9-302933
May 22, 1998 [JP] Japan ................................... 10-140764
Sep. 4, 1998 [JP] Japan ................................... 10-251147

[51] Int. Cl.$^7$ ................................................. F16K 11/078
[52] U.S. Cl. ...................................... 137/625.43; 251/288
[58] Field of Search ......................... 137/625.43; 251/59, 251/288

[56] References Cited

U.S. PATENT DOCUMENTS 5,690,144 11/1997 Takahashi ........................... 137/625.43
5,937,902 8/1999 Ohno et al. ......................... 137/625.43
5,992,459 11/1999 Sugita et al. ....................... 137/625.43

FOREIGN PATENT DOCUMENTS 8-42737 2/1996 Japan .
9-292050 11/1997 Japan .

*Primary Examiner*—John Fox
*Attorney, Agent, or Firm*—McDermott, Will & Emery

[57] ABSTRACT

A rotary channel-selector valve is provided, which includes: a valve-seat plate covering one end of a cylindrical valve housing and provided with low and high pressure ports and two switching ports all connecting the inside and the outside of the valve; and a main valve element accommodated in the valve housing and provided with low and high pressure connecting grooves on one end surface thereof, wherein one (or the other) of the switching ports communicates with the low pressure port through the low pressure connecting groove and simultaneously the other (or one) thereof communicates with the high pressure port through the high pressure connecting groove at a first (or second) channel-switching position of the main valve element. A bulkhead is provided on a bottom surface of the high pressure connecting groove and both end portions of the high pressure connecting groove open to an inner surface of the valve housing through respective high pressure fluid jetting grooves so as to hold stable the main valve element at the first or second channel-switching position. Flow of high pressure fluid jetting to the high pressure connecting groove is then disturbed by the bulkhead, difference in power between flow of the high pressure fluid jetting from the both end portions of the high pressure connecting groove to the periphery of the main valve element through the respective high pressure fluid jetting grooves arises and brings about rotating force to the main valve element, and thus the main valve element being it rotation can surely get to a due channel-switching position.

2 Claims, 23 Drawing Sheets

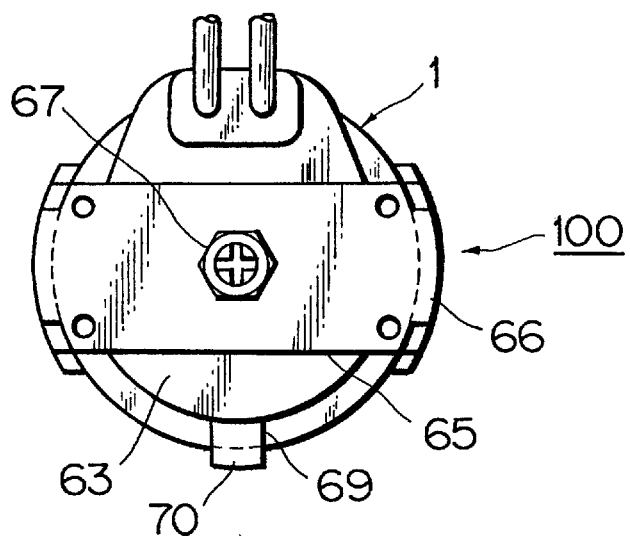
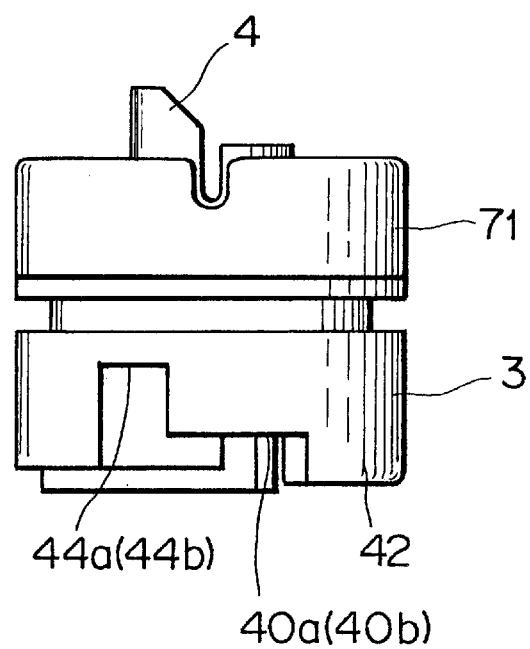
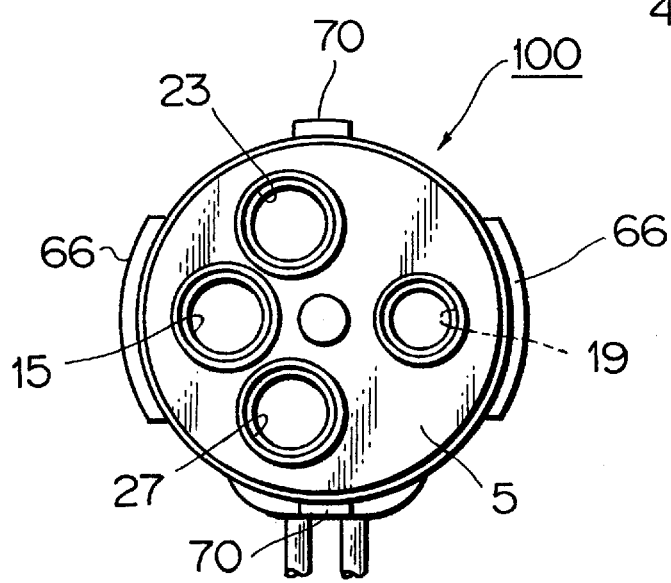

VIEW A (IN FIG.1)

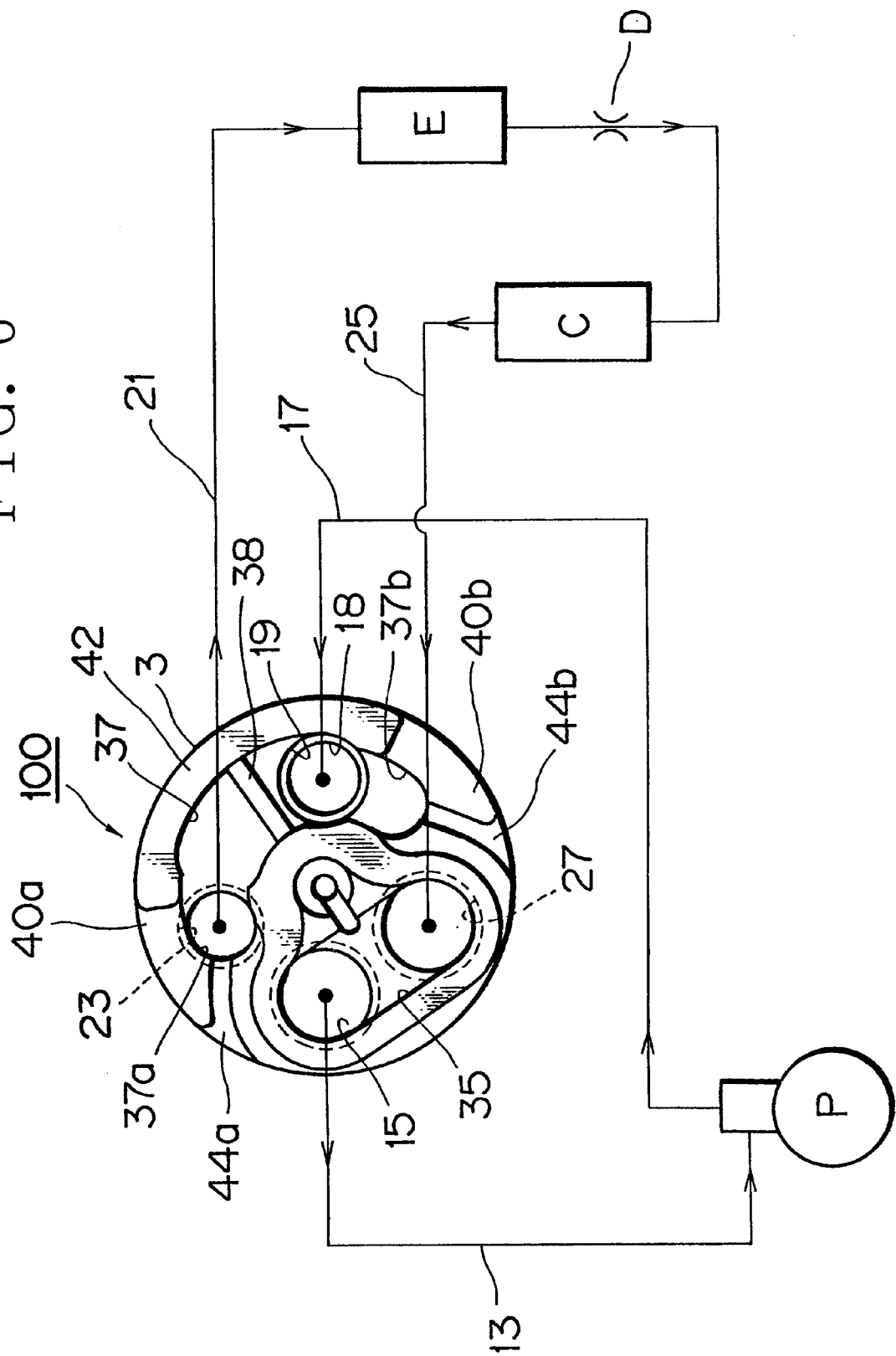

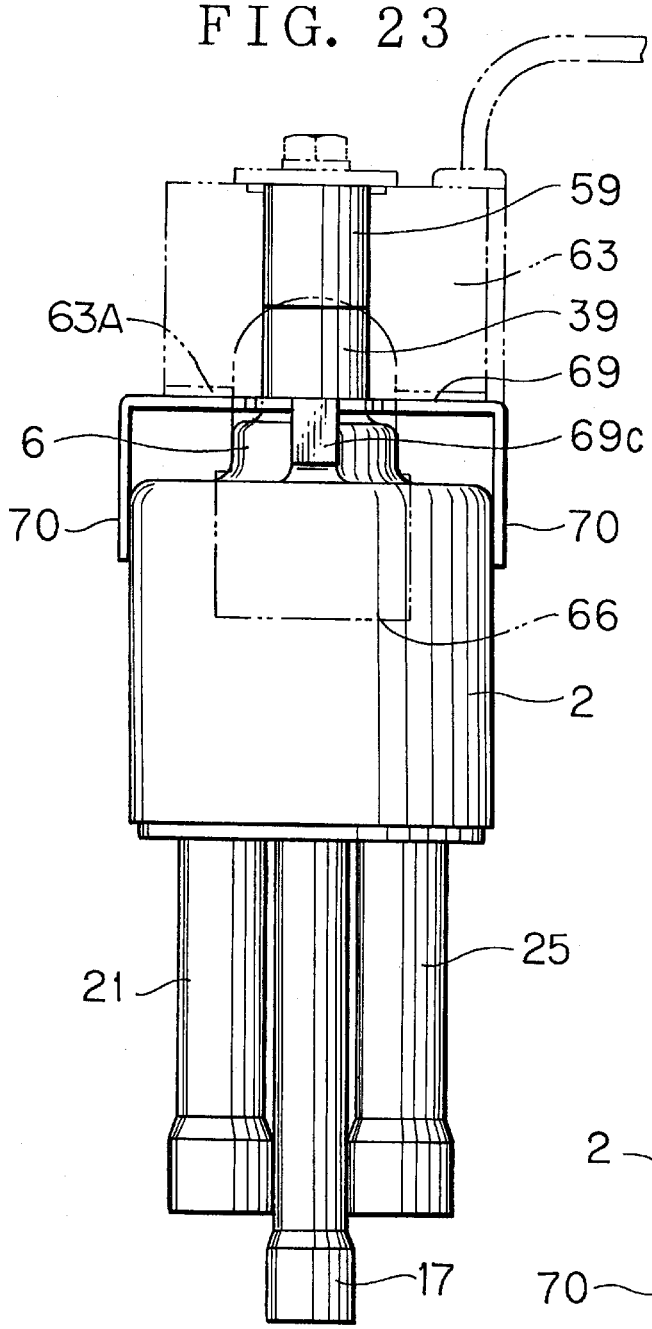
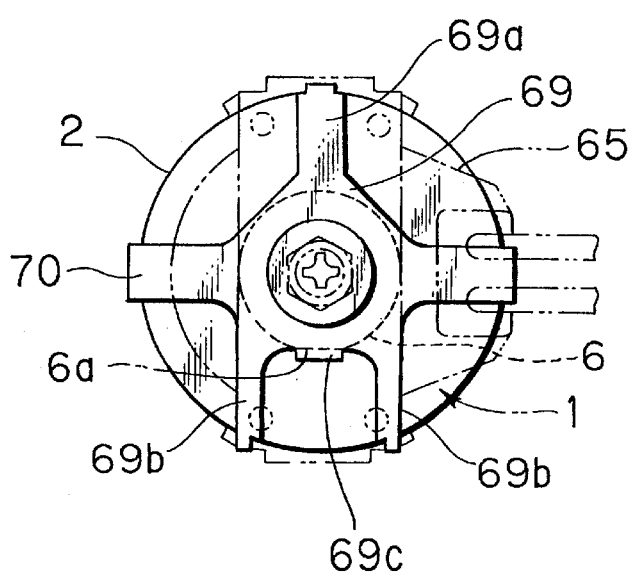
FIG. 23
FIG. 24

ROTARY CHANNEL-SELECTOR VALVE

BACKGROUND OF THE INVENTION

1. Field of the Invention

The present invention generally relates to a rotary channel-selector valve and more particularly, to a rotary channel-selector valve such as a 4-way valve which is applied to a switching mechanism of heating/cooling in a heat pump system and to a structure of a main valve element of the valve.

2. Description of the Related Art

A channel-selector valve wherein a main valve element separates from a valve-seat plate during valve-switching movement by opening or closing a pilot passage penetrating the main valve element in an axial direction has been proposed by the same applicant in Japanese Patent Application Laid-open No.9-292050 (hereinafter "JP '050") as a rotary channel-selector valve wherein a connecting point of a low pressure port provided on a valve-seat plate, fixed to a valve housing and put into contact with an end surface of a main valve element, shifts from one of first and second switching ports on the valve-seat plate to the other one thereof by rotating, in the valve housing, the main valve element, having a high pressure connecting groove and a low pressure connecting groove on the end surface thereof, between first and second channel-switching positions and simultaneously a connecting point of a high pressure port of the valve-seat plate shifts from the other one of the first and second switching ports to the one thereof.

A 4-way valve proposed in JP '050 is superior to a conventional one in the following points. That is, the 4-way valve in JP '050 enables a heat pump system to start cooling or operation in a shorter time after valve-switching movement since a high pressure port and a low pressure port communicates during the valve-switching movement thereby to equalize pressure in both of the pressure ports without stopping a compressor, differing from a conventional rotary channel-selector valve, and further the main valve element can be rotated with smaller force since static friction force at rotation start and also sliding resistance both between the main valve element and the valve-seat plate are smaller due to the separation of the main valve element from the valve-seat plate during the valve-switching movement.

As described above, since the 4-way valve proposed in JP '050 executes the valve switching movement without stopping the compressor, a space is formed between the valve-seat plate and the main valve element separated from the valve-seat plate during the valve-switching movement, and therefore the main valve element is pushed in a direction of separating the main valve element from the valve-seat plate by pressure of a high pressure fluid filled in the space.

Consequently, the main valve element separated from the valve-seat plate should abut against any member in the valve housing and movement of the separation of the main valve element from the valve-seat plate should be limited and the main valve element should be pushed on the member.

Therefore, if the fluid pressure in the space formed between the valve-seat plate and the main valve element separated from the valve-seat plate is too high, the main valve element beginning rotation between the first channel-switching position and the second channel-switching position is forced to stop on the way by contact resistance against the above member limiting the separation movement, thereby causing incomplete rotation of the main valve element.

Moreover, since the high pressure fluid jetting from the high pressure port to the space between the main valve element and the valve-seat plate during the valve-switching movement is not simply directed to the low pressure port and turbulent flow arises by an existence of the high and low pressure connecting grooves formed on the end surface of the main valve element, the main valve element beginning rotation between the first and second channel-switching positions is forced to stop on the way by receiving rotating force opposite to the rotating direction, thereby causing incomplete rotation of the main valve element.

More specifically, the 4-way valve proposed in JP '050 has a structure consisting of the valve housing being in a cylindrical shape; the main valve element provided in the valve housing rotatably and axially movably; the valve-seat plate fixed to the valve housing and having the low pressure port connected to a low pressure piping, the high pressure port connected to a high pressure piping, and at least one switching port; a pilot valve supported by the main valve element by axially movably engaging a valve holding hole formed in the main valve element for selectively connecting the low pressure port to a pressure chamber formed on one end surface side of the main valve element and receiving pressure of the high pressure port by opening or closing a valve port formed on the main valve element; and an electromagnetic solenoid for rotating the main valve element and for opening or closing the pilot valve, wherein the end surface, facing oppositely to the pressure chamber, of the main valve element is put into contact with the valve-seat plate and the main valve element selectively connects the switching port to either one of the low pressure port and the high pressure port by rotation of the main valve element itself.

With respect to the above conventional rotary channel-selector valve of JP '050, since the pilot valve consists integrally of the stem portion engaging the valve holding hole axially movably and attracted by the electromagnetic solenoid and of a needle valve portion to open or close the valve port, a supporting condition of the stem portion by the valve port directly affects radial position or directional position of the needle valve portion relative to the valve port, thereby causing a uncertainty of shutting off the valve port by the needle valve portion.

Especially, in case of providing a communicating passage connecting the valve port and the pressure chamber between the stem portion of the pilot valve and the valve holding hole to receive the stem portion, the stem portion would get rickety, whereby radial position or directional position of the needle valve portion relative to the valve port becomes unstable, thereby making shutoff characteristics of the valve port by the needle valve portion worse.

Further, a concentric machining accuracy between the stem portion and the needle valve portion and also a concentric machining accuracy between the valve holding hole and the valve port also affect shutoff characteristics of the valve port, and accordingly designed shutoff characteristics of the valve port can not be attained without the above machining accuracy being high.

In case that the stem portion of the pilot valve is held by both of the valve housing and the main valve element by means of engagement of the stem portion with a pilot valve guide-tube formed on the valve housing having the electromagnetic solenoid and with the valve holding hole of the main valve element having the valve port, a positioning accuracy of the pilot valve guide-tube formed on the valve housing and an assembling accuracy of the main valve element to the valve housing directly affects radial position or directional position of the needle valve portion relative to the valve port, thereby causing a uncertainty of shutting off the valve port by the needle valve portion.

And, in case that a fixed attractor of the electromagnetic solenoid is provided on the pilot valve guide-tube of the valve housing oppositely to one end of the stem portion of the pilot valve and also a chamber is formed in the pilot valve guide-tube and between the stem portion and the fixed attractor, fluid like a lubricant or a refrigerant would invade the chamber through clearance between the stem portion and the pilot valve guide-tube and stay in the chamber, thereby causing a uncertainty of smooth opening and closing movement of the pilot valve.

Further, with respect to the above rotary channel-selector valve, the electromagnetic coil is fixed to the magnetic pole equipping electromagnetic surface of the valve housing for rotating the main valve element by the magnetic action against a multipolar magnet.

In the above rotary channel-selector valve and the like, since the magnet pole pieces, magnetized by the electromagnetic coil, on the valve housing side rotates the main valve element by the magnetic action against the multipolar magnet on the main valve element side, the magnet pole pieces have to be circumferentially positioned on the valve housing for rotating the main valve element accurately between a predetermined channel-switching positions. To cope with the above, for example, a 4-way valve disclosed in Japanese Patent Application Laid-open No.8-42737 (hereinafter "JP '737") has a positioning projection provided on a body-cap of a body (a valve housing) and simultaneously a concave formed on one end surface, contacting the above body-cap, of a coil bobbin of an electromagnet having an iron core (magnet pole pieces), and then the magnet pole pieces are circumferentially positioned on the valve housing by positioning the electromagnet relatively to the valve housing by means of engagement between the positioning projection on the body-cap and the concave of the coil bobbin.

The above positioning means of the magnet pole pieces of the 4-way valve functions satisfactorily. However, the positioning means would require an improvement for necessity of forming a concave or convex on the coil bobbin, wherein troublesome work of designing a metal mold correspondingly to the concave or convex is required, in comparison with forming a concave or convex on a body side by method of punching or pressing, since the positioning between the body and the coil bobbin is done by direct engagement between them.

SUMMARY OF THE INVENTION

In view of the foregoing, an first object of the present invention is to provide a rotary channel-selector valve wherein rotary switching movement of a main valve element can be surely performed without increasing rotating force given from outside even in case that the rotary switching movement is executed in a state of the main valve element being separated from a valve-seat plate.

And, a second object of the present invention is to provide a rotary channel-selector valve wherein even if a supporting condition of a stem portion by a valve port, a concentricity between the stem portion and a needle valve portion, a concentric machining accuracy between a valve holding hole and the valve port, a positioning accuracy of a pilot valve guide-tube, or an assembling accuracy of a main valve element to a valve housing is not so good, radial position or directional position of the needle valve portion relative to the valve port can be corrected, the valve port is surely shut off by the needle valve portion, and a shock to the valve port and to the needle valve portion at the time of closing the pilot valve can be lightened.

Further, a third object of the present invention is to provide a rotary channel-selector valve wherein even if fluid like a lubricant or a refrigerant invades a chamber formed with a pilot valve guide-tube, a stem portion, and a fixed attractor, the fluid does not stay in the chamber so that smooth opening and closing movement of the pilot valve can be assured for a long period.

Still further, a fourth object of the present invention is to provide a rotary channel-selector valve wherein circumferential positioning of magnet pole pieces can be surely performed without newly forming a structure on a coil bobbin itself for the positioning.

In order to achieve the above-described first object, as a first aspect of the present invention, a rotary channel-selector valve consists of: a valve housing; a main valve element accommodated in the valve housing, being capable of rotating between a first channel-switching position and a second channel-switching position, and having high and low pressure connecting grooves isolated from each other on one end surface thereof; a valve-seat plate, fixed to the valve housing, facing the one end surface of the main valve element, and having high and low pressure ports and first and second switching ports, wherein a connecting point of the high pressure port shifts from one of the first and second switching ports to the other thereof through the high pressure connecting groove by rotating the main valve element between the first and second channel-switching positions and simultaneously a connecting point of the low pressure port shifts from the other of the first and second switching ports to the one thereof through the low pressure connecting groove, and rotation of the main valve element between the first and second channel-switching positions is performed with the one end surface of the main valve element being apart from the valve-seat plate; a first high pressure fluid jetting groove formed on the one end surface of the main valve element, wherein one end portion, of the high pressure connecting groove, positioned near the high pressure port at the first channel-switching position opens to a periphery of the main valve element through the first high pressure fluid jetting groove; a second high pressure fluid jetting groove formed on the one end surface of the main valve element and being isolated from the first high pressure fluid jetting groove, wherein another end portion, of the high pressure connecting groove, positioned near the high pressure port at the second channel-switching position opens to the periphery of the main valve element through the second high pressure fluid jetting groove; and a bulkhead being in a shape of a projecting strip and provided on a bottom surface of the high pressure connecting groove, wherein since high pressure fluid jetting from the high pressure port to the high pressure connecting groove flows easier toward the first high pressure fluid jetting groove than toward the second high pressure fluid jetting groove by an action of the bulkhead in a state that the high pressure port positions nearer one end portion of the high pressure connecting groove than the bulkhead, power of a first high pressure flow jetting from the first high pressure fluid jetting groove to the periphery of the main valve element wins power of a second high pressure flow jetting from the second high pressure fluid jetting groove to the periphery of the main valve element and rotating force in a direction from the second channel-switching position to the first channel-switching position acts on the main valve element due to difference of power between the first high pressure flow and the second high pressure flow, and, on the contrary, since high pressure fluid jetting from the high pressure port to the high pressure connecting groove flows easier toward the second high pressure fluid jetting groove than toward the first high pressure fluid jetting groove by an action of the bulkhead in a state that the high pressure port positions nearer another end portion of the high pressure connecting groove than the bulkhead, power of a second high pressure flow jetting from the second high pressure fluid jetting groove to the periphery of the main valve element wins power of a first high pressure flow jetting from the first high pressure fluid jetting groove to the periphery of the main valve element and rotating force in a direction from the first channel-switching position to the second channel-switching position acts on the main valve element due to difference of power between the first high pressure flow and the second high pressure flow.

In order to achieve the above-described second object, as a second aspect of the present invention, a rotary channel-selector valve consists of: a valve housing being in a cylindrical shape; a main valve element provided in the valve housing rotatably and axially movably; a valve-seat plate fixed to the valve housing and having a low pressure port connected to a low pressure piping, a high pressure port connected to a high pressure piping, and at least one switching port; a pilot valve supported by the main valve element by axially movably engaging a valve holding hole formed in the main valve element for selectively connecting the low pressure port to a pressure chamber formed on one end surface side of the main valve element and suffering pressure of the high pressure port by opening or closing a valve port formed on the main valve element; and an electromagnetic solenoid for rotating the main valve element and for opening or closing the pilot valve, wherein an end surface, facing oppositely to the pressure chamber, of the main valve element is put into contact with the valve-seat plate and the main valve element selectively connects the switching port to either one of the low pressure port and the high pressure port by rotation of the main valve element itself, and the pilot valve consists separately of a stem portion engaging the valve holding hole axially movably and attracted by the electromagnetic solenoid and of a needle valve portion to open or close the valve port so as to enable the needle valve portion to shift radially and axially with respect to the stem portion.

In order to achieve the above-described third object, as a third aspect of the present invention, a rotary channel-selector valve consists of: a valve housing being in a cylindrical shape; a main valve element provided in the valve housing rotatably and axially movably; a valve-seat plate fixed to the valve housing and having a low pressure port connected to a low pressure piping, a high pressure port connected to a high pressure piping, and at least one switching port; a pilot valve supported by the main valve element by axially movably engaging a valve holding hole formed in the main valve element for selectively connecting the low pressure port to a pressure chamber formed on one end surface side of the main valve element and suffering pressure of the high pressure port by opening or closing a valve port formed on the main valve element; an electromagnetic solenoid for rotating the main valve element and for opening or closing the pilot valve, wherein an end surface, facing oppositely to the pressure chamber, of the main valve element is put into contact with the valve-seat plate and the main valve element selectively connects the switching port to either one of the low pressure port and the high pressure port by rotation of the main valve element itself; a pilot valve guide-tube constituting the valve housing for receiving a stem portion of the pilot valve axially movably; a fixed attractor, of the electromagnetic solenoid, provided on the pilot valve guide-tube oppositely to one end of the stem portion; and a bleeding passage formed in the stem portion for opening a chamber, formed in the pilot valve guide-tube and between the stem portion and the fixed attractor, to the pressure chamber.

In order to achieve the above-described fourth object, as a fourth aspect of the present invention, a rotary channel-selector valve consists of: a valve housing being in a cylindrical shape and having a valve-seat portion therein; a main valve element provided in the valve housing rotatably within a predetermined range of angle for channel-switching along with the valve-seat portion by rotation; a multipolar magnet fixed to the main valve element; an electromagnetic coil; and a magnetic pole equipping electromagnetic coil attaching body fixed to the valve housing, equipped with the electromagnetic coil, and having magnet pole pieces magnetized by the electromagnetic coil and facing a peripheral surface of the valve housing for rotating the main valve element by a magnetic action against the multipolar magnet, wherein the valve housing has a flat surface partially on the peripheral surface thereof and the magnetic pole equipping electromagnetic coil attaching body has a whirl-stopping piece surface-engaging the flat surface so that the magnetic pole equipping electromagnetic coil attaching body is circumferentially positioned on the valve housing by a surface-engagement between the flat surface and the whirl-stopping piece.

In order to achieve the above-described fourth object, further as a fifth aspect of the present invention, a rotary channel-selector valve may consist of: a valve housing being in a cylindrical shape and having a valve-seat portion therein; a main valve element provided in the valve housing rotatably within a predetermined range of angle for channel-switching along with the valve-seat portion by rotation; a multipolar magnet fixed to the main valve element; an electromagnetic coil; and a magnetic pole equipping electromagnetic coil attaching body fixed to the valve housing, equipped with the electromagnetic coil, and having magnet pole pieces magnetized by the electromagnetic coil and facing a peripheral surface of the valve housing for rotating the main valve element by a magnetic action against the multipolar magnet, wherein the valve housing has a mounting engagement portion with a flat side-surface and the magnetic pole equipping electromagnetic coil attaching body has a concave to engage the mounting engagement portion so that the magnetic pole equipping electromagnetic coil attaching body is circumferentially positioned on the valve housing by engaging the mounting engagement portion with the concave.

According to the first aspect of the rotary channel-selector valve in accordance with the present invention, the main valve element rotates from the first channel-switching position to the second channel-switching position, and with a shift of position of the high pressure port from a state that the high pressure port is relatively positioned nearer one end portion of the high pressure connecting groove than the bulkhead to another state that the high pressure port is relatively positioned nearer the other end portion of the high pressure connecting groove than the bulkhead, power of the first high pressure flow jetting from the high pressure port to the high pressure connecting groove and then from the first high pressure fluid jetting groove to the periphery of the main valve element wins power of the second high pressure flow jetting from the high pressure port to the high pressure connecting groove and then from the second high pressure fluid jetting groove to the periphery of the main valve element, and accordingly, rotating force to the main valve element in a direction from the first channel-switching position to the second channel-switching position arises.

On the other hand, the main valve element rotates from the second channel-switching position to the first channel-switching position, and with a shift of position of the high pressure port from a state that the high pressure port is relatively positioned nearer the other end portion of the high pressure connecting groove than the bulkhead to another state that the high pressure port is relatively positioned nearer one end portion of the high pressure connecting groove than the bulkhead, power of the second high pressure flow jetting from the high pressure port to the high pressure connecting groove and then from the second high pressure fluid jetting groove to the periphery of the main valve element wins power of the first high pressure flow jetting from the high pressure port to the high pressure connecting groove and then from the first high pressure fluid jetting groove to the periphery of the main valve element, and accordingly, rotating force to the main valve element in a direction from the second channel-switching position to the first channel-switching position arises.

In other words, even if the main valve element starts rotation from any one of the first and second channel-switching positions to the other channel-switching position, additional rotating force having the same direction as the other force from the outside and caused by difference of power between the first high pressure flow and the second high pressure flow newly acts on the main valve element simultaneously with shift of relative position of the high pressure port to an opposite end of the high pressure connecting groove by passing the bulkhead.

Accordingly, in a state of the main valve element being apart from the valve-seat plate during rotation of the main valve element between the first channel-switching position and the second channel-switching position, even if force arises due to fluid pressure in a space formed between the main valve element and the valve-seat plate and separates the main valve element from the valve-seat plate, or even if rotating force, being in an opposite direction to the rotating direction, due to a turbulent flow arising in a space formed between the main valve element and the valve-seat plate acts on the main valve element, the main valve element can be surely rotated to the final rotating position, thereby completing valve switching movement.

Also, according to the rotary channel-selector valve in accordance with the present invention, a valve outside-passage communicating with the high pressure port is formed between an inner surface of the valve housing and a periphery of the main valve element, a pressure chamber communicating with the valve outside-passage is formed between one end surface of the main valve element and the valve housing, a gate portion opening the high pressure connecting groove to the periphery of the main valve element is formed on the other end surface of the main valve element, and a pilot passage connecting the low pressure connecting groove and the pressure chamber and being capable of flowing larger quantity than that of the valve outside-passage is formed in the main valve element. The main valve element is pushed to the valve-seat plate side by the high pressure fluid flowing into the pressure chamber through the gate portion and the valve outside-passage after jetting from the high pressure port to the high pressure connecting groove by closing the pilot passage provided in the valve housing by the pilot valve, and, on the contrary, the main valve element separates from the valve-seat plate by disappearance of force pushing the main valve element toward the valve-seat plate by drop of pressure in the pressure chamber by opening the pilot passage by the pilot valve. The first high pressure fluid jetting groove and the second high pressure fluid jetting groove each have a larger cross-section than that of the gate portion. And, power of the first high pressure flow wins that of a third high pressure flow jetting from the high pressure connecting groove to the periphery of the main valve element through the gate portion in a state that the high pressure port positions nearer one end portion of the high pressure connecting groove than the bulkhead, and, on the contrary, power of the second high pressure flow wins that of the third high pressure flow jetting from the high pressure connecting groove to the periphery of the main valve element through the gate portion in a state that the high pressure port positions nearer another end portion of the high pressure connecting groove than the bulkhead, thereby enabling the followings.

In other words, one end surface of the main valve element abuts on the valve-seat plate by introducing the high pressure fluid, jetting from the high pressure port to the high pressure connecting groove of the main valve element, to the pressure chamber through the gate portion of the main valve element and the valve outside-passage and, on the contrary, the one end surface of the main valve element separates from the valve-seat plate by introducing the high pressure fluid of the pressure chamber into the low pressure port through the pilot passage of the main valve element with the pilot valve being in a opened state and through the low pressure connecting groove. This structure can prevent an additional rotating force, newly acting on the main valve element by difference of power between the first high pressure flow and the second high pressure flow and having the same direction as another force given from the outside, from being weakened or vanished.

And, the above-mentioned main valve element with the gates and the high pressure fluid jetting grooves has a structural feature of even thickness being advantageous for the molding process, which enables improvement of dimensional accuracy and manufacturing stability, thereby improving a yield rate and reducing a cost.

Further, pressure loss can be reduced, or a flow coefficient can be increased by studying rotation property of the main valve element and further studying shape of the main valve element for attaining better stability in channel-switching movement.

According to the second aspect of the rotary channel-selector valve in accordance with the present invention, since a needle valve portion is separately formed from a stem portion of a pilot valve so as to enable the needle valve portion to shift radially and axially in the stem portion, the needle valve portion tilts relatively to the valve port correspondingly to difference in radial or axial position between the needle valve portion and the valve port, that is, with this self-aligning structure, position of the needle valve portion relative to the valve port can be corrected, and even if a supporting condition of the stem portion by the valve port, a concentricity between the stem portion and the needle valve portion, a concentric machining accuracy between a valve holding hole and the valve port, a positioning accuracy of a pilot valve guide-tube, or an assembling accuracy of the main valve element to a valve housing is not so good, radial position or directional position of the needle valve portion relative to the valve port can be corrected, thereby ensuring to shut off the valve port with the needle valve portion.

Further, since the needle valve portion and the stem portion are connected movably in the axial direction of the main valve element, a shock of a hit by the needle valve portion against the valve port at the time of closing the pilot valve can be lightened, thereby improving durability of the needle valve portion and the valve port against wear or chipping or the like.

And, according to the rotary channel-selector valve in accordance with the present invention, since a spherical portion of the needle valve portion abuts on the stem portion, the needle valve portion can tilt self-aligningly against the stem portion and directional position of the needle valve portion relative to the stem portion can be corrected, and consequently, even if a supporting condition of the stem portion by the valve port, a concentricity between the stem portion and the needle valve portion, a concentric machining accuracy between the valve holding hole and the valve port, a positioning accuracy of the pilot valve guide-tube, or an assembling accuracy of the main valve element to the valve housing is not so good, directional position of the needle valve portion relative to the valve port can be corrected, thereby ensuring to shut off the valve port with the needle valve portion.

Also, since a high-slippery resin plate is provided at an abutting portion between the spherical portion and the stem portion, the needle valve portion can surely tilt self-aligningly with low resistance, and directional position of the needle valve portion relative to the valve port can be corrected, thereby ensuring to shut off the valve port with the needle valve portion.

Further, according to the rotary channel-selector valve in accordance with the present invention, since a compression spring is assembled between the needle valve portion and the stem portion, the needle valve portion does not get rickety against the stem portion in a valve-opened state and valve closing-pressure can be controlled with the compression coil spring.

Also, since a shock of a hit by the needle valve portion against the valve port at the time of closing the pilot valve can be absorbed by the compression spring, shock reducing effect increases and then durability of the needle valve portion and the valve port against wear or chipping or the like can be improved.

Still further, according to the rotary channel-selector valve in accordance with the present invention, since a chamber formed with a pilot valve guide-tube, the stem portion, and a fixed attractor opens to a pressure chamber through a bleeding passage, fluid like a lubricant or a refrigerant does not stay in the chamber, thereby assuring smooth opening and closing movement of the pilot valve for a long period.

Finally, according to the rotary channel-selector valve in accordance with the present invention, the valve-seat plate has two switching ports of first and second switching ports, and the main valve element can rotate between a first channel-switching position, which connects a low pressure port to the first switching port and simultaneously a high pressure port to the second switching port, and a second channel-switching position, which connects the low pressure port to the second switching port and simultaneously the high pressure port to the first switching port, thus enabling the followings as a 4-way valve used in the heat pump system.

Namely, by the rotation of the main valve element between a first channel-switching position, which connects a low pressure port to the first switching port and simultaneously a high pressure port to the second switching port, and a second channel-switching position, which connects the low pressure port to the second switching port and simultaneously the high pressure port to the first switching port, the rotary channel-selector valve functions as a 4-way valve used in the heat pump system, thereby ensuring to shut off the valve port with the needle valve portion and assuring smooth opening and closing movement of the pilot valve for a long period.

According to the third aspect of the rotary channel-selector valve in accordance with the present invention, since a magnetic pole equipping electromagnetic coil attaching body is circumferentially positioned on a valve housing wherein a rotatable range of a main valve element is limited within a predetermined angle by a surface-engagement between a flat surface formed on a peripheral surface of the valve housing and a whirl-stopping piece of the magnetic pole equipping electromagnetic coil attaching body, circumferential positioning of magnet pole pieces can be surely performed without newly forming a structure on a coil bobbin itself of an electromagnetic coil for the positioning.

And, according to the rotary channel-selector valve in accordance with the present invention, the magnetic pole equipping electromagnetic coil attaching body has an outer box, having a pair of main magnetic pole pieces arranged with a circumferential difference by 180 degrees each other, and an under plate, made of a metal sheet and having a pair of minor magnetic pole pieces assembled to the outer box with a circumferential difference by 180 degrees each other and also with a circumferential difference by 90 degrees against the main magnetic pole pieces and further the whirl-stopping piece is formed by downwardly bending the under plate, which enables the followings.

Namely, since the magnetic pole equipping electromagnetic coil attaching body consists of the outer box having main magnetic pole pieces and the under plate made of a metal sheet and having minor magnetic pole pieces and the magnetic pole equipping electromagnetic coil attaching body is circumferentially positioned on the valve housing by the surface-engagement between the flat surface formed on the peripheral surface of the valve housing and the whirl-stopping piece of the under plate, circumferential positioning of the magnet pole pieces can be surely performed without newly forming a structure on the coil bobbin itself of the electromagnetic coil for the positioning.

According to fourth and fifth aspects of the rotary channel-selector valve in accordance with the present invention, since a magnetic pole equipping electromagnetic coil attaching body is circumferentially positioned on a valve housing wherein a rotatable range of a main valve element is limited within a predetermined angle by engaging a mounting engagement portion formed on an fixed attractor and having flat side-surfaces with a concave of a magnetic pole equipping electromagnetic coil attaching body, circumferential positioning of main and minor magnetic pole pieces can be surely performed without newly forming a structure on the coil bobbin itself of the electromagnetic coil for the positioning.

And, according to the rotary channel-selector valve in accordance with the present invention, since the magnetic pole equipping electromagnetic coil attaching body has an outer box, having a pair of main magnetic pole pieces arranged with a circumferential difference by 180 degrees each other, and an under plate, made of a metal sheet and having a pair of minor magnetic pole pieces assembled to the outer box with a circumferential difference by 180 degrees each other and also with a circumferential difference by 90 degrees against the main magnetic pole pieces and further the concave is press-formed on the outer box, thereby enabling the followings.

Namely, since the magnetic pole equipping electromagnetic coil attaching body consists of the outer box having main magnetic pole pieces and the under plate made of a metal sheet and having minor magnetic pole pieces and the magnetic pole equipping electromagnetic coil attaching body is circumferentially positioned on the valve housing by engaging the mounting engagement portion with the concave being press-formed on the outer box, circumferential positioning of the main and minor magnetic pole pieces can be surely performed without newly forming a structure on the coil bobbin itself of the electromagnetic coil for the positioning.

The above and other objects and features of the present invention will become more apparent from the following description taken in conjunction with the accompanying drawing figures.

BRIEF DESCRIPTION OF THE DRAWING FIGURES

FIG. 2 is a plan view showing the rotary channel-selector valve of FIG. 1;

FIG. 3 is a bottom view showing the rotary channel-selector valve of FIG. 1;

FIG. 6 is a flow diagram of refrigerant at a heating operation of a heat pump system using the rotary channel-selector valve of FIG. 1;

FIG. 7 is a side view showing a main valve element of FIG. 1;

FIG. 23 is a side view showing an assembled body made up of a valve housing, a fixed attractor, and an under plate of the rotary channel-selector valve of FIG. 15;

FIG. 24 is a plan view showing an assembled body made up of a valve housing, a fixed attractor, and an under plate of the rotary channel-selector valve of FIG. 15;

DETAILED DESCRIPTION OF THE PREFERRED EMBODIMENTS

Embodiments of the present invention will now be described in further detail with reference to the accompanying drawing figures. "specific structure of a first embodiment of a rotary channel-selector valve in accordance with the present invention"

FIGS. 1 to 8 show a structure of a first embodiment of a 4-way valve, used as a channel-selector valve in a refrigerating cycle, in accordance with the present invention.

Figure 1:
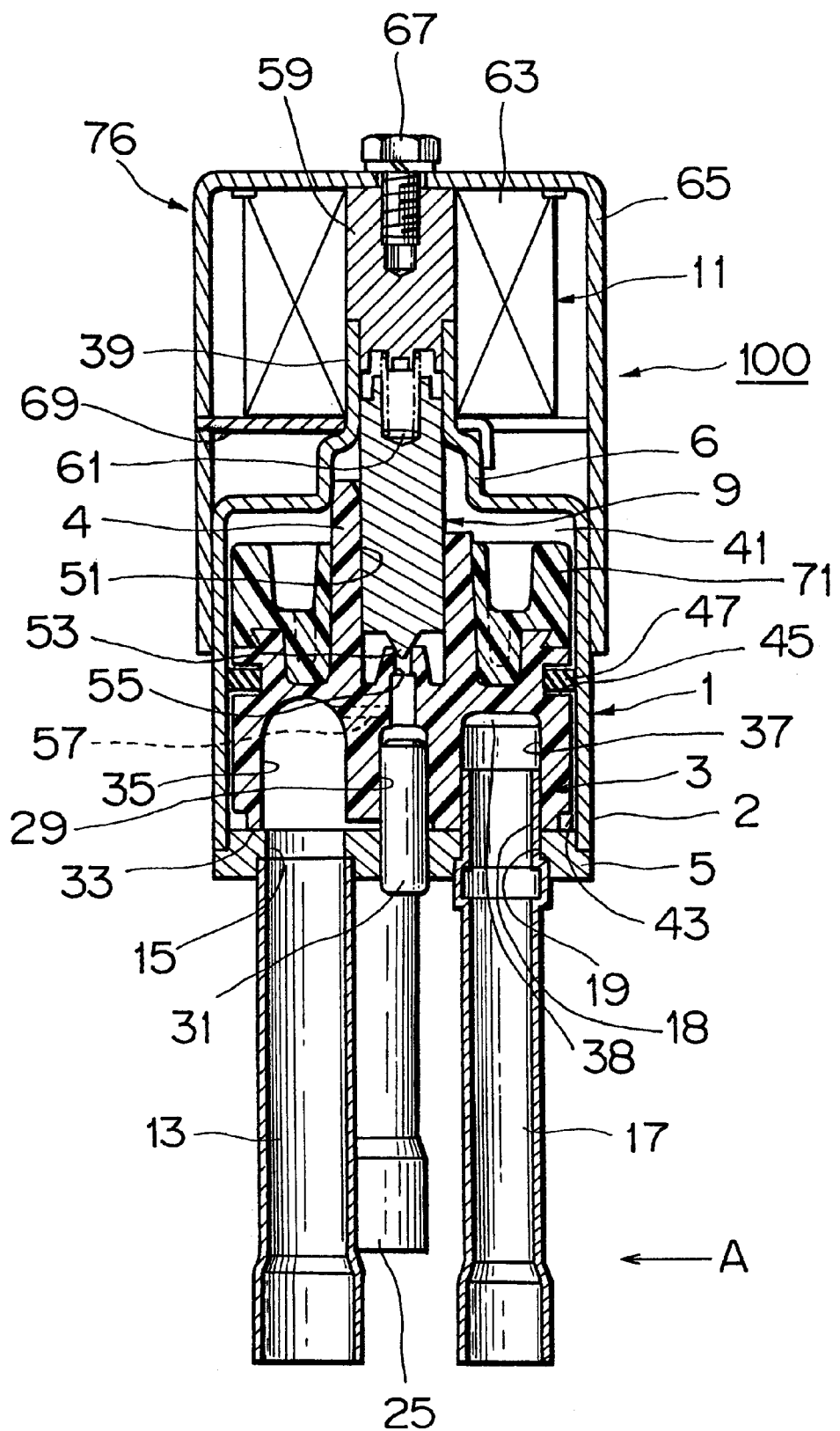
FIG. 1 is a longitudinal sectional view showing a first embodiment of a rotary channel-selector valve in accordance with the present invention.

As shown in FIG. 1, the rotary channel-selector valve has a cylindrical valve housing 1, a main valve element 3 provided rotatably and axially movably in the valve housing 1, a valve-seat plate 5 fixed to a bottom portion of the valve housing 1, a pilot valve 9 assembled to the main valve element 3, and an electromagnetic solenoid 11 installed on top of the valve housing 1.

Figure 5:
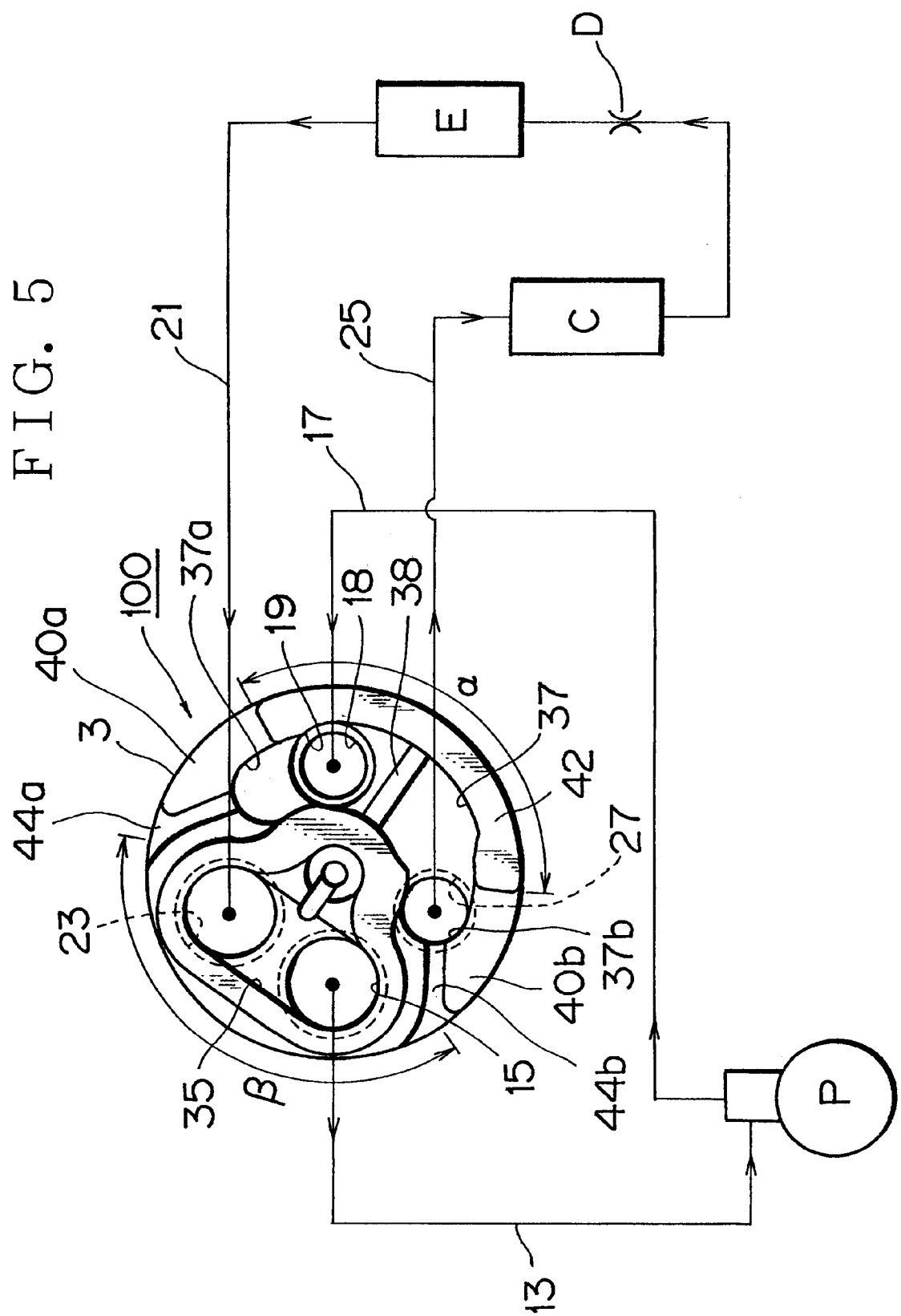
FIG. 5 is a flow diagram of refrigerant at a cooling operation of a heat pump system using the rotary channel-selector valve of FIG. 1.

As shown in FIG. 5, the rotary channel-selector valve is constructed as a 4-way valve 100 used in a heat pump system, and the valve-seat plate 5 is provided, around its center, with a low pressure port 15 to be connected to a low pressure piping 13 connected to an inlet of a compressor P in the heat pump system, a high pressure port 19 to be connected to a high pressure piping 17 connected to an outlet of the compressor P, a first switching port 23 to be connected to a piping 21 connected to an indoor heat exchanger E, and a second switching port 27 to be connected to a piping 25 connected to an outdoor heat exchanger C.

The valve housing 1 consists, as shown in FIG. 1, of a large-diameter cylindrical portion 2 to receive the main valve element 3, a main valve element guide-tube 6, and a pilot valve guide-tube 39 by integrally concentrically forming them with a pressing deep drawing process.

The valve housing 1 can be of a structure in which the large-diameter cylindrical portion 2, the main valve element guide-tube 6, and the pilot valve guide-tube 39 are separately formed and assembled.

A central guide hole 29 provided on the bottom portion of the main valve element 3 engages a center pin 31 fixed to the valve-seat plate 5, and a tonguepiece-like guide portion 4 upwardly projecting from the main valve element 3 engages the main valve element guide-tube 6 of the valve housing 1 axially movably, whereby the main valve element 3 is capable of rotating around own axis between a first channel-switching position and a second channel-switching position and of axially linearly moving up and down between a risen position and a dropped position.

The guide portion 4 is formed in opposition to a side of a high pressure connecting groove 37 and prevents inclination of the main valve element 3, caused by fluid pressure on a high pressure side, by means of an abutment on the main valve element guide-tube 6.

Figure 4:
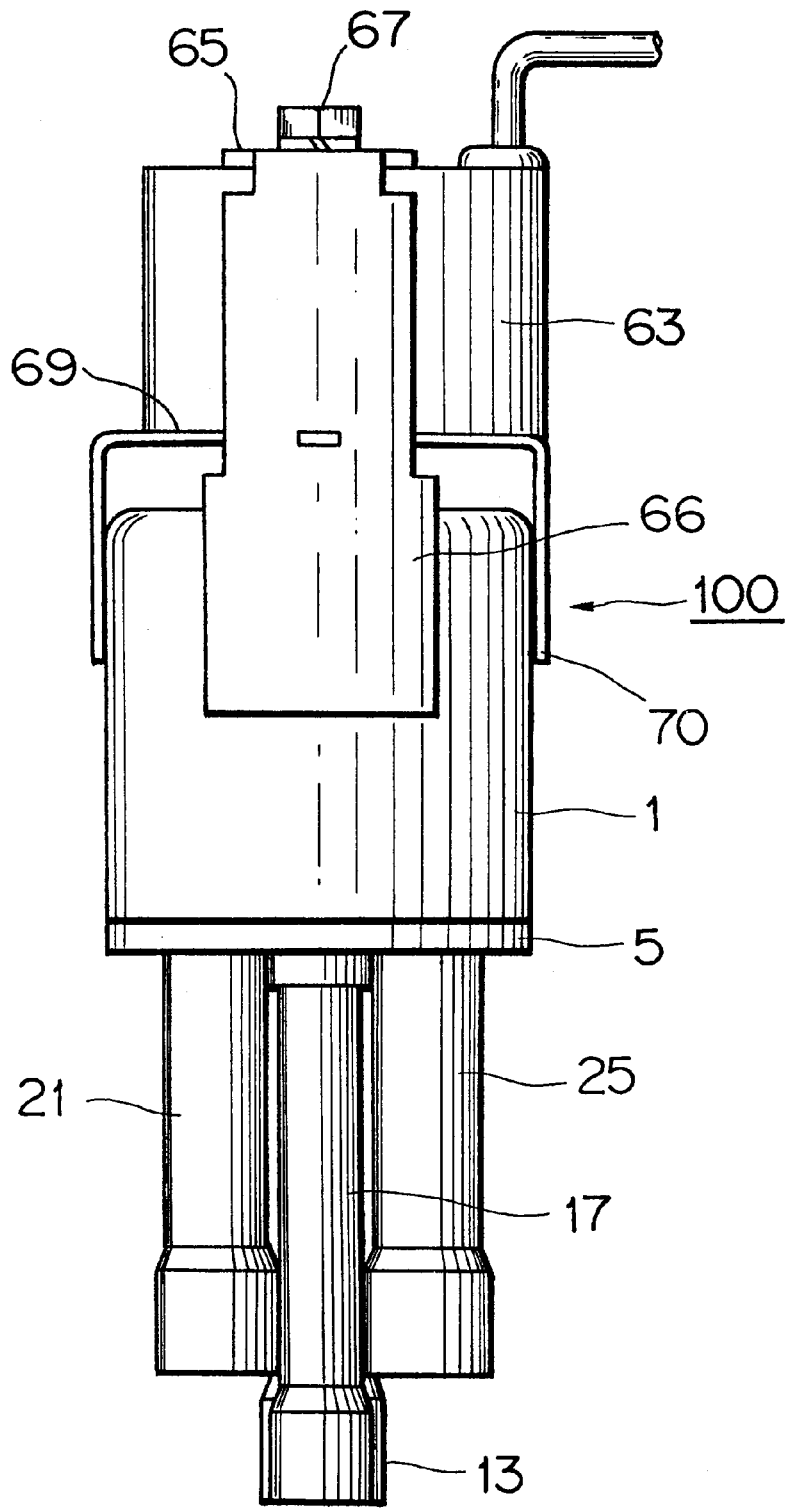
FIG. 4 is a side view showing the rotary channel-selector valve of FIG. 1.

A bottom surface (one end surface) 33 of the main valve element 3 is put into contact with the valve-seat plate 5 when the main valve element 3 is at the dropped position, and as shown in FIGS. 4 and 5 the main valve element 3 is provided with a low pressure connecting groove 35 and the high pressure connecting groove 37 which are apart from the center of the bottom surface 33 and are independent and isolated each other. The low pressure connecting groove 35 connects the low pressure port 15 to the first switching port 23 or to the second switching port 27, and the high pressure connecting groove 37 connects the high pressure port 19 to the first switching port 23 or to the second switching port 27.

More specifically, as shown in FIG. 5, when the main valve element 3 is at the first channel-switching position, the high pressure port 19 is located near a portion of one end 37a of the high pressure connecting groove 37, and the low pressure connecting groove 35 connects the low pressure port 15 and the first switching port 23 and the high pressure connecting groove 37 connects the high pressure port 19 and the second switching port 27.

On the other hand, as shown in FIG. 6, when the main valve element 3 is at the second channel-switching position, the high pressure port 19 is located near a portion of the other end 37b of the high pressure connecting groove 37, and the low pressure connecting groove 35 connects the low pressure port 15 and the second switching port 27 and the high pressure connecting groove 37 connects the high pressure port 19 and the first switching port 23.

Based on the above, in a switched state of the first channel-switching position of the main valve element 3, as shown in FIG. 5, a refrigerant circulation of "compressor P→4-way valve 100→outdoor heat exchanger C→throttling D→indoor heat exchanger E→4-way valve 100→compressor P" is established and the heat pump system is set to a cooling mode.

On the other hand, in a switched state of the second channel-switching position of the main valve element 3, as shown in FIG. 6, another refrigerant circulation of "compressor P→4-way valve 100→indoor heat exchanger E→throttling D→outdoor heat exchanger C→4-way valve 100→compressor P" is established and the heat pump system is set to a heating mode.

As shown in FIG. 1, an end of the high pressure piping 17 projects into the high pressure connecting groove 37 through the high pressure port 19, the end of the high pressure piping 17 functions as a stopper 18 which abuts on an inner wall surface of the high pressure connecting groove 37 and limits rotation range of the main valve element 3 to a reciprocating range between the first channel-switching position and the second channel-switching position.

As shown in FIGS. 5 and 6, the main valve element 3 is provided with a bulkhead (a stabilizer) 38 by a projecting strip on a bottom surface (a ceiling surface) intermediate the high pressure connecting groove 37, and the bulkhead 38 is positioned between the high pressure port 19 and the second switching port 27 at the first channel-switching position and also positioned between the high pressure port 19 and the first switching port 23 at the second channel-switching position.

As shown in FIGS. 5 and 7, near the respective end portions 37a,37b of the high pressure connecting groove 37, the main valve element 3 is provided with first and second gates 40a,40b which open the vicinity of each of the end portions 37a,37b of the high pressure connecting groove 37 to an inner surface of the valve housing 1.

Height of the bulkhead 38 shall be smaller than depth of the high pressure connecting groove 37 and shall not interfere with the end of the high pressure piping 17 projecting into the high pressure connecting groove 37 as the stopper 18, that is, the height would be within a range of 1 to 3 mm with 1 to 3 mm in width. The gates 40a,40b shall not reach the bottom surface (the ceiling surface) of the high pressure connecting groove 37, in other words, depth of the gates 40a,40b shall be smaller than thickness of the high pressure connecting groove 37, that is, would be within a range of 3 to 7 mm.

A skirt portion 42 to slide on the inner surface of the valve housing 1 is provided between the both gates 40a,40b. Extend angle α of the skirt portion 42 would be between 40~100 degrees.

The main valve element 3 is provided, on the bottom surface 33 thereof, with first and second high pressure fluid jetting grooves 44a,44b arranged on respective sides of the low pressure connecting groove 35 and connecting the respective end portions 37a,37b of the high pressure connecting groove 37 to the periphery of the main valve element 3. Depth and width of both the high pressure fluid jetting grooves 44a,44b would be between 10 to 15 mm, and 1 to 7 mm, respectively, and separation angle β of both the high pressure fluid jetting grooves 44a,44b would be between 60 to 180 degrees.

Whole of the main valve element 3 is made of molded plastic, and the ports 15,19,23, and 27, the low pressure connecting groove 35, the high pressure connecting groove 37, the bulkhead 38, the first and second gates 40a,40b, the skirt portion 42, and the first and second high pressure fluid jetting grooves 44a,44b all are integrally formed.

And, a multipolar magnet 71 of plastic magnet is integrally provided by multiple molding on top of the main valve element 3. The multipolar magnet 71 is in a ring-like shape coaxially with the main valve element 3 and has a pair of the north portions and another pair of the south pole portions which are alternately arranged in a rotating direction.

A pressure chamber 41 is formed on an upper side (the other end surface side) of the main valve element 3 with use of the valve housing 1 and the pilot valve 9 fit in the pilot valve guide-tube 39 formed on top of the valve housing 1. The pressure chamber 41 communicates with the high pressure connecting groove 37 and the high pressure port 19 through a bypass clearance 43 (a valve outside-passage) between the pilot valve 9 and the main valve element 3 and through a communicating clearance (not shown) between both end portions of a C-like piston ring 47 fit in a piston ring groove 45 of the main valve element 3, and is under pressure of the high pressure port 19.

The pilot valve guide-tube 39 is formed coaxially with the large-diameter cylindrical portion 2 and with the main valve element guide-tube 6 of the valve housing 1, and a stem portion 10 of the pilot valve 9 is axially movably fit in the pilot valve guide-tube 39 and in a valve holding hole 51 having a circular cross-section and formed in the central portion of the main valve element 3, and thus an end of a needle valve portion 53 opens and/or closes a valve port 55 formed on the main valve element 3.

With this structure, the pilot valve 9 fits axially movably in both of the pilot valve guide-tube 39 on the side of the valve housing 1 and the valve holding hole 51 on the side of the main valve element 3, thereby supported by both of the valve housing 1 and the main valve element 3.

Figure 8A:
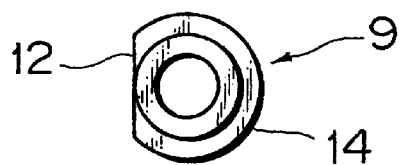
FIGS. 8A to 8D are end views of a variety of a pilot valve of FIG. 1.
Figure 8B:
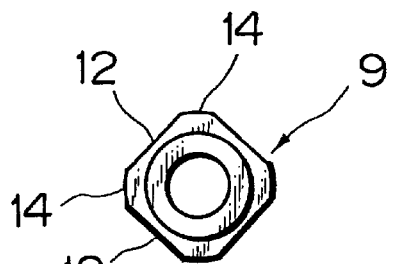
Figure 8C:
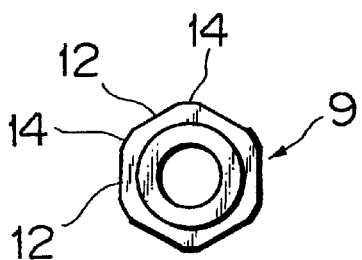

Here, with respect to other specific shapes of the stem portion 10, for example, as shown in FIGS. 8A to 8C, the ones having a D-shaped cross-section or a polygonal cross-section each having at least one cut-surface 12 on a peripheral surface, wherein only the remaining circumferential surface 14 is put into contact with the pilot valve guide-tube 39 and with the valve holding hole 51, may be considered.

In these cases, a passage (not shown) connecting the pressure chamber 41 with the valve port 55 is formed between the cut-surface 12 of the pilot valve 9 and the valve holding hole 51.

Figure 8D:
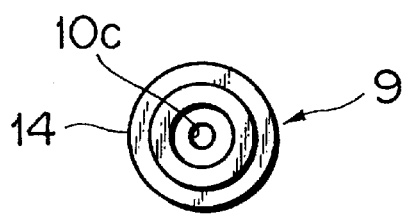

Further, with respect to another specific shape of the stem portion 10, as shown in FIG. 8D, the one being in a substantially cylindrical shape corresponding to an inner diameter of the pilot valve guide-tube 39 and of the valve holding hole 51, wherein whole the circumference of the circumferential surface 14 is put into contact with the pilot valve guide-tube 39 and with the valve holding hole 51, may be considered.

Figure 8E:
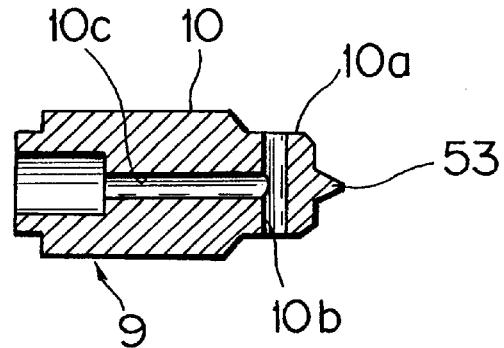
FIG. 8E is a sectional view of the pilot valve of FIG. 8D.

In this case, as shown in FIG. 8E, a small diameter portion 10a is formed at an end portion, near the needle valve portion 53, of the stem portion 10, and a through passage 10b crossing the axis of the stem portion 10 in a radial direction is provided through the small diameter portion 10a, while a communicating passage 10c extending from an end surface near the pilot valve guide-tube 39 located on the opposite side of the needle valve portion 53 to the center of the through passage 10b is formed in the stem portion 10 in the axial direction. Thus, the through passage 10b and the communicating passage 10c, and clearance between the small diameter portion 10a and the valve holding hole 51 constitutes a passage connecting the pressure chamber 41 with the valve port 55.

As shown in FIG. 1, the valve port 55 is located in the center of the bottom portion of the valve holding hole 51 and communicates with the pressure chamber 41 through the bypass clearance 43 on one hand and with the low pressure connecting groove 35 through a communicating hole 57 on the other hand.

The stem portion 10 of the pilot valve 9 is axially slidable in the center of the electromagnetic solenoid 11, and the pilot valve 9 is forced by a spring 61 provided between the pilot valve 9 and a fixed attractor 59 in a valve-closing direction. On the other hand, the pilot valve 9 is attracted by the fixed attractor 59, which is arranged in the pilot valve guide-tube 39 facingly to an upper end surface of the stem portion 10, against spring force of the spring 61 by exciting an electromagnetic coil 63 of the electromagnetic solenoid 11, and leaves the valve port 55, thereby opening the pilot valve 9.

As shown in FIGS. 2 to 4, the electromagnetic coil 63 is fixed to the fixed attractor 59 being as a part of the valve housing 1 by means of a magnetic pole equipping electromagnetic coil attaching body 76. The magnetic pole equipping electromagnetic coil attaching body 76 has an assembled body consisting of an outer box 65, being in a staple-like shape and having a pair of main magnetic pole pieces 66 arranged with a circumferential difference by 180 degrees each other, and an under plate 69 made of a metal sheet and having a pair of minor magnetic pole pieces 70 assembled to the outer box 65 with a circumferential difference by 180 degrees each other and also with a circumferential difference by 90 degrees against the main magnetic pole pieces 66.

The outer box 65 is magnetically connected to one magnetic pole on the upper side of the electromagnetic coil 63, and the under plate 69 is magnetically connected to the other magnetic pole on the lower side of the electromagnetic coil 63. As shown in FIGS. 1 and 4, the main magnetic pole pieces 66 and the minor magnetic pole pieces 70 are put into contact with the peripheral surface of the large-diameter cylindrical portion 2 of the valve housing 1 and rotate the main valve element 3 by the magnetic action against the multipolar magnet 71. With this structure, the main magnetic pole pieces 66 face one magnetic poles of the multipolar magnet 71 through a peripheral wall of the valve housing 1, and the minor magnetic pole pieces 70 face the other magnetic poles of the multipolar magnet 71 through the peripheral wall of the valve housing 1.

As shown in FIG. 1, the magnetic pole equipping electromagnetic coil attaching body 76 is fixed with a bolt 67 to an upper end surface of the fixed attractor 59 through the outer box 65, and the under plate 69 is positioned against the outer box 65 and fixed to it. With this, relative position between the main magnetic pole pieces 66 and the minor magnetic pole pieces 70 is uniformly decided and this location-ship does not change.

In the above-described electromagnetic actuator structure with the electromagnetic solenoid 11 and the multipolar magnet 71, the main magnetic pole pieces 66 are magnetized to the north pole and the minor magnetic pole pieces 70 are magnetized to the south pole, and viceversa, according to direction of current in the electromagnetic coil 63 of the electromagnetic solenoid 11, whereby the main valve element 3 rotates from the first channel-switching position to the second channel-switching position, and viceversa, by the magnetic action against the multipolar magnet 71.

In the 4-way valve 100 having the above-described structure, when an electric current is sent to the electromagnetic coil 63 of the electromagnetic solenoid 11 under a state shown in FIG. 1, the fixed attractor 59 is excited and the pilot valve 9 is attracted by the fixed attractor 59 and moved upward against spring force by the spring 61, and then the valve port 55 opens.

Accordingly, the pressure chamber 41 communicates with the low pressure connecting groove 35 and the low pressure port 15, and internal pressure of the pressure chamber 41 goes down from high pressure of the high pressure port 19 to low pressure of the low pressure port 15 suffering suction pressure of the compressor P. Consequently, the upper side of the main valve element 3 suffers lower pressure than the lower side of the main valve element 3, and the main valve element 3 rises by this pressure difference, separates from the valve-seat plate 5, and becomes in a state of being capable of rotating with low resistance.

Here, reason for the pressure drop of the pressure chamber 41 in a state of the pilot valve 9 being open is that flow resistance between the pressure chamber 41 and the high pressure connecting groove 37 communicating with the high pressure port 19 due to the communicating clearance of the piston ring 47 is larger than flow resistance due to the passage connecting the pressure chamber 41 with the low pressure connecting groove 35 in the state of the pilot valve 9 being open.

In the state described above, the main valve element 3 rotates from the first channel-switching position shown in FIG. 5 to the second channel-switching position shown in FIG. 6 by the magnetic action between the multipolar magnet 71 and all of the magnetized main magnetic pole pieces 66 and the magnetized minor magnetic pole pieces 70, and viceversa, whereby the heat pump cycle is switched to the cooling mode or the heating mode.

After this, by stopping sending an electric current to the electromagnetic coil 63, the pilot valve 9 drops by spring force by the spring 61 and closes, thereby shutting off the communication between the pressure chamber 41 and the low pressure connecting groove 35, and then pressure of the high pressure connecting groove 37, i.e. of the high pressure port 19, is introduced into the pressure chamber 41 through the bypass clearance 43 and the communicating clearance of the piston ring 47, whereby pressure in the pressure chamber 41 becomes the same pressure as in a space under the main valve element 3. Consequently, the main valve element 3 returns to the original dropped position by spring force by the spring 61 and by an own weight and comes into close contact with the valve-seat plate 5.

During rotation of the main valve element 3, with the bottom surface 33 of the main valve element 3 being apart from the valve-seat plate 5, from the first channel-switching position as shown in FIG. 5 toward the second channel-switching position as shown in FIG. 6 by sending an electric current to the electromagnetic coil 63, a shift of relative position of the high pressure port 19 against the high pressure connecting groove 37 from a state that the high pressure port 19 is positioned between the bulkhead 38 and the first high pressure fluid jetting groove 44a to another state that the high pressure port 19 is positioned between the bulkhead 38 and the second high pressure fluid jetting groove 44b brings the following.

When the high pressure port 19 is relatively positioned between the bulkhead 38 and the first high pressure fluid jetting groove 44a, a second high pressure flow being separated from the high pressure fluid jetting from the high pressure port 19 to the high pressure connecting groove 37 and being led to the bypass clearance 43 through the second high pressure fluid jetting groove 44b is disturbed by the bulkhead 38, and a part of the disturbed flow of the high pressure fluid joins to a first high pressure flow led to the bypass clearance 43 through the first high pressure fluid jetting groove 44a, whereby power of the first high pressure flow wins that of the second high pressure flow. On the contrary, when the high pressure port 19 is relatively positioned between the bulkhead 38 and the second high pressure fluid jetting groove 44b, power of the second high pressure flow wins that of the first high pressure flow.

Accordingly, during rotation of the main valve element 3 from the first channel-switching position to the second channel-switching position, when position of the high pressure port 19 relative to the bulkhead 38 has shifted from the first high pressure fluid jetting groove 44a side to the second high pressure fluid jetting groove 44b side, rotating force in a direction from the first channel-switching position to the second channel-switching position (i.e. a counterclockwise sense in FIG. 6) caused by power of the second high pressure flow being greater than power of the first high pressure flow is newly added to the main valve element 3, thereby ensuring to rotate the main valve element 3 to the second channel-switching position without stopping.

On the contrary, during rotation of the main valve element 3 from the second channel-switching position toward the first channel-switching position by sending an electric current to the electromagnetic coil 63, a shift of relative position of the high pressure port 19 against the high pressure connecting groove 37 from a state that the high pressure port 19 is positioned between the bulkhead 38 and the second high pressure fluid jetting groove 44b to another state that the high pressure port 19 is positioned between the bulkhead 38 and the first high pressure fluid jetting groove 44a brings the following.

When the high pressure port 19 is relatively positioned between the bulkhead 38 and the second high pressure fluid jetting groove 44b, the first high pressure flow being separated from the high pressure fluid jetting from the high pressure port 19 to the high pressure connecting groove 37 and being led to the bypass clearance 43 through the first high pressure fluid jetting groove 44a is disturbed by the bulkhead 38, and a part of the disturbed flow of the high pressure fluid joins to the second high pressure flow led to the bypass clearance 43 through the second high pressure fluid jetting groove 44b, whereby power of the second high pressure flow wins that of the first high pressure flow. On the contrary, when the high pressure port 19 is relatively positioned between the bulkhead 38 and the first high pressure fluid jetting groove 44a, power of the first high pressure flow wins that of the second high pressure flow.

Accordingly, during rotation of the main valve element 3 from the second channel-switching position to the first channel-switching position, when position of the high pressure port 19 relative to the bulkhead 38 has shifted from the second high pressure fluid jetting groove 44b side to the first high pressure fluid jetting groove 44a side, rotating force in a direction from the second channel-switching position to the first channel-switching position (i.e. a clockwise sense in FIG. 5) caused by power of the first high pressure flow being greater than power of the second high pressure flow is newly added to the main valve element 3, thereby ensuring to rotate the main valve element 3 to the first channel-switching position without stopping.

Here, during rotation of the main valve element 3 from the first channel-switching position to the second channel-switching position or oppositely from the second channel-switching position to the first channel-switching position, power of a third high pressure flow led from the high pressure connecting groove 37 to the bypass clearance 43 through each of the first and second gates 40a,40b is smaller than that of the first high pressure flow and of the second high pressure flow. Therefore, power of the third high pressure flow does not disturb the additional rotating force to the main valve element 3 by power of the first high pressure flow or of the second high pressure flow.

As described above, during rotation of the main valve element 3 by sending an electric current to the electromagnetic coil 63 of the electromagnetic solenoid 11, with the bottom surface 33 of the main valve element 3 being apart from the valve-seat plate 5, from one of the first and second channel-switching positions to the other of the positions, rotating force of the main valve element 3 is increased by means of the additional rotating force arisen from difference in power of the respective first and second high pressure flows led from the high pressure connecting groove 37 to the bypass clearance 43 through the respective first and second high pressure fluid jetting grooves 44a,44b, and thereby the main valve element 3 surely rotates. In other words, required driving force for rotating the main valve element 3 by means of the magnetic action to the multipolar magnet 71 due to the magnetism generated on the electromagnetic coil 63 is reduced.

Also, in a state that driving force for rotating the main valve element 3 by means of the magnetic action to the multipolar magnet 71 due to the magnetism generated on the electromagnetic coil 63 does not work by stopping sending an electric current to the electromagnetic coil 63 of the electromagnetic solenoid 11, the main valve element 3 remains stable at the first channel-switching position or at the second channel-switching position by the above-mentioned additional rotating force arisen from difference in power of the respective first and second high pressure flows.

Like the above, the bulkhead 38 acts as a stabilizer for keeping the main valve element 3 stable at the first channel-switching position or at the second channel-switching position in a state that an electric current to the electromagnetic coil 63 of the electromagnetic solenoid 11 is stopped.

And, the above-mentioned main valve element 3 with the first and second gates 40a,40b and the first and second high pressure fluid jetting grooves 44a,44b has a structural feature of even thickness being advantageous for the molding process, which enables improvement of dimensional accuracy and manufacturing stability, thereby improving a yield rate and reducing a cost.

Further, pressure loss of the 4-way valve 100 can be reduced, or a flow coefficient of the same can be increased by studying rotation property of the main valve element 3 and further studying shape of the main valve element 3 for attaining better stability in channel-switching movement of the 4-way valve 100.

"specific structure of a second embodiment of a rotary channel-selector valve in accordance with the present invention"

Figure 9:
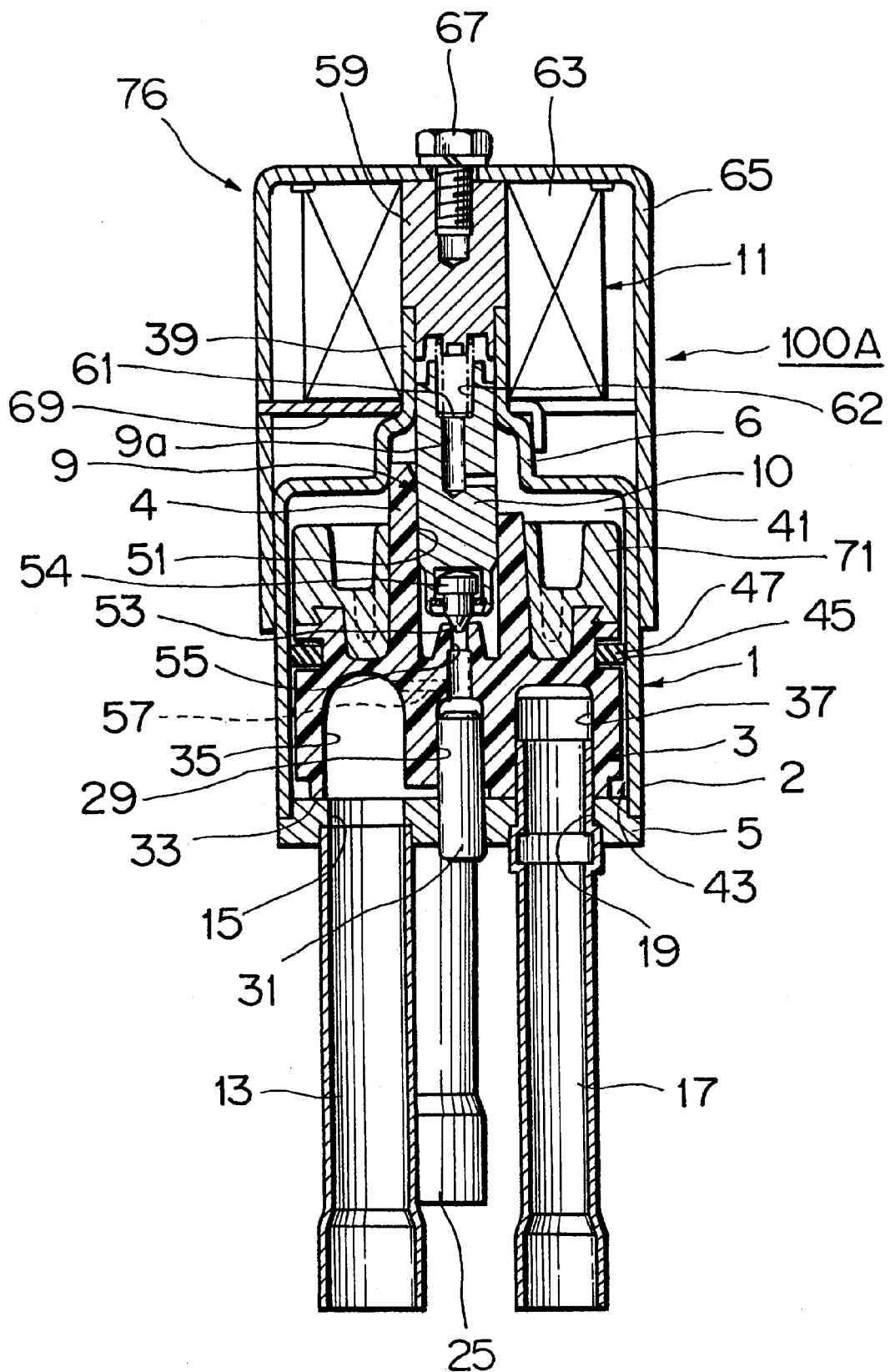
FIG. 9 is a longitudinal sectional view showing a second embodiment of a rotary channel-selector valve in accordance with the present invention.

Next, FIG. 9 shows a structure of a second embodiment of a 4-way valve, used as a channel-selector valve in a refrigerating cycle, in accordance with the present invention.

For the 4-way valve shown in FIG. 9, the same reference numerals as in FIG. 1 are allotted to the same members or portions as in FIG. 1 showing the first embodiment of a 4-way valve for a refrigerating cycle, and iterative descriptions are omitted hereinafter.

In the 4-way valve 100A of the second embodiment, since a needle valve portion 53 is separately formed from a stem portion 10 of a pilot valve 9, the needle valve portion 53 can shift radially in the stem portion 10.

Figure 10:
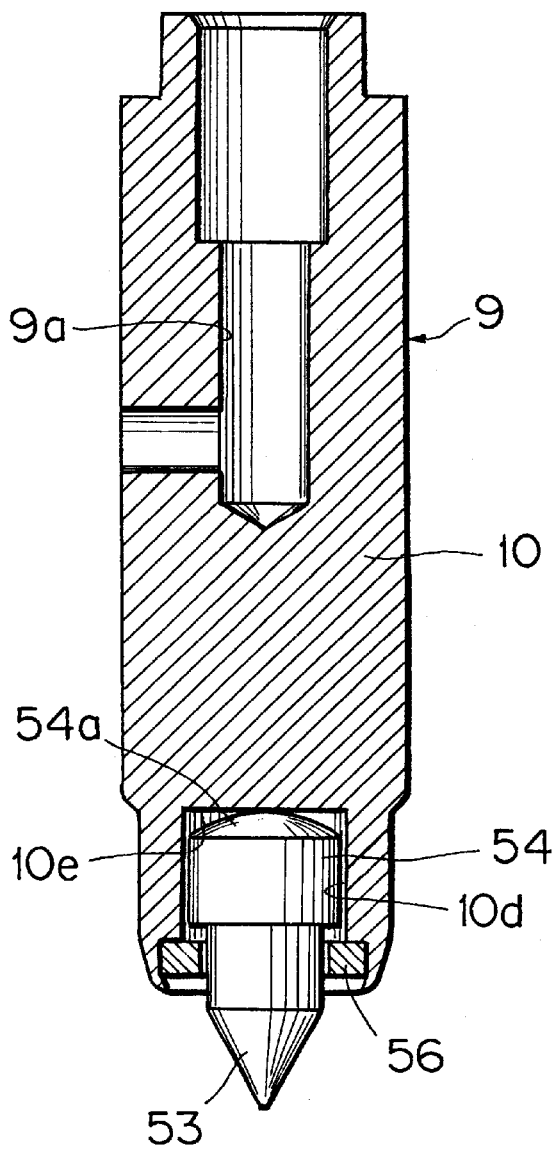
FIG. 10 is a sectional view of a pilot valve of FIG. 9.

As shown in FIG. 10, the needle valve portion 53 has a head 54 movably accommodated in a needle valve supporting hole 10d formed at an end portion of the stem portion 10 and is allowed to move radially and axially within a predetermined range by a fixed ring 56 fixed the end of the stem portion 10.

The head 54 has a spherical head surface 54a to abut on a bottom surface (a ceiling surface) 10e of the needle valve supporting hole 10d. With this mechanism, the needle valve portion 53 can tilt by about 2 degrees against the stem portion 10.

And, as shown in FIG. 9, a pilot valve guide-tube 39 is provided with a chamber (i.e. a spring chamber) 62 between the stem portion 10a and a fixed attractor 59.
A bleeding passage 9a to open the chamber 62 to a pressure chamber 41 is formed in the stem portion 10, and a passage connecting the pressure chamber 41 with a valve port 55 is formed with the chamber 62, the bleeding passage 9a, and a clearance between the stem portion 10 and a valve holding hole 51.

In the 4-way valve 100A of the second embodiment, constructed as above, since the needle valve portion 53 is separately formed from the stem portion 10 of the pilot valve 9 so as to enable the needle valve portion 53 to shift radially in the stem portion 10, the needle valve portion 53 radially self-aligningly shifts relatively to the valve port 55 during a process of closing the valve port 55 with the needle valve portion 53, that is, radial position of the needle valve portion 53 relative to the valve port 55 can be automatically corrected during the process.

Further, since the spherical head surface 54a of the needle valve portion 53 abuts on the bottom surface 10e of the needle valve supporting hole 10d, the needle valve portion 53 can tilt self-aligningly against the stem portion 10 and directional position of the needle valve portion 53 relative to the stem portion 10 can be corrected automatically.

With the above structure or mechanism, even if a supporting condition of the stem portion 10 by the valve port 55, a concentricity between the stem portion 10 and the needle valve portion 53, a concentric machining accuracy between the valve holding hole 51 and the valve port 55, a positioning accuracy of the pilot valve guide-tube 39, or an assembling accuracy of the main valve element 3 to the valve housing 1 is not so good, radial position or directional position of the needle valve portion 53 relative to the valve port 55 can be corrected, thereby ensuring to shut off the valve port 55 with the needle valve portion 53.

Further, since the chamber 62 formed with the pilot valve guide-tube 39, the stem portion 10, and the fixed attractor 59 opens to the pressure chamber 41 through the bleeding passage 9a, even if fluid like a lubricant or a refrigerant invades the chamber 62, the fluid flows to the pressure chamber 41 through the bleeding passage 9a without staying in the chamber 62, thereby assuring smooth opening and closing movement of the pilot valve 9 for a long period.

Still further, since the needle valve portion 53 and the stem portion 10 are connected movably in the axial direction of the main valve element 3, a shock of a hit by the needle valve portion 53 against the valve port 55 at the time of closing the pilot valve 9 can be lightened with axial movement of the needle valve portion 53 relative to the stem portion 10, thereby improving durability of the needle valve portion 53 and the valve port 55 against wear or chipping or the like.

FIGS. 11 to 14 show modified embodiments of the pilot valve 9 assembled to the rotary channel-selector valve in accordance with the present invention. In FIGS. 11 to 14, the same reference numerals as in FIG. 10 are allotted to the same members or portions as in FIG. 10, and iterative descriptions are omitted.

Figure 11:
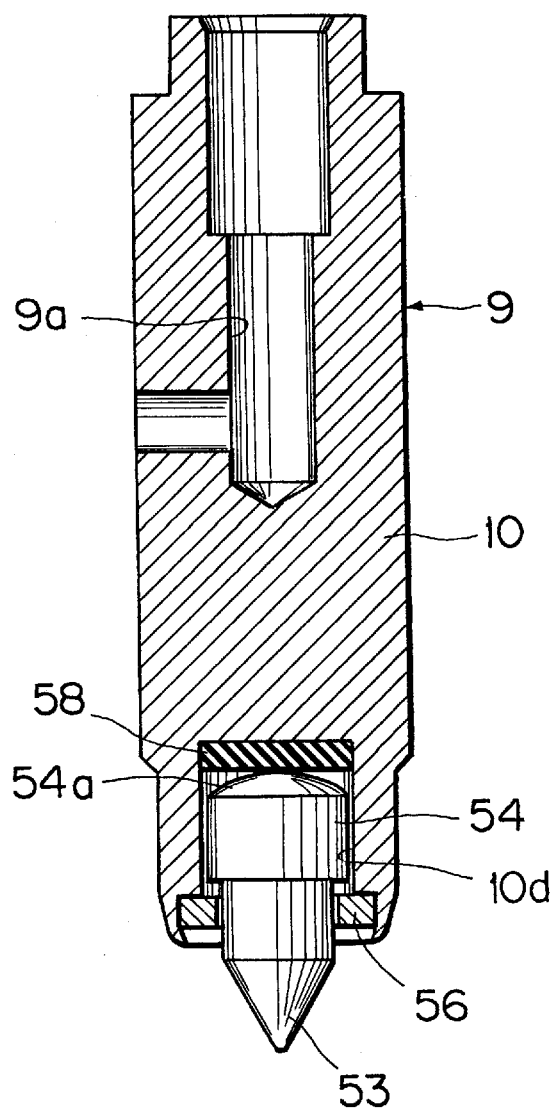
FIG. 11 is a sectional view showing a modified embodiment of a pilot valve applicable to the rotary channel-selector valve of FIG. 9.

In a modified embodiment shown in FIG. 11, a high-slippery resin plate 58 of fluororesin with high elasticity is arranged on the bottom portion of the needle valve supporting hole 10d, and therefore the spherical head surface 54a of the needle valve portion 53 abuts on the stem portion 10 through the high-slippery resin plate 58.

With this structure, the needle valve portion 53 can surely tilt self-aligningly relatively to the stem portion 10 with low resistance.

Figure 12:
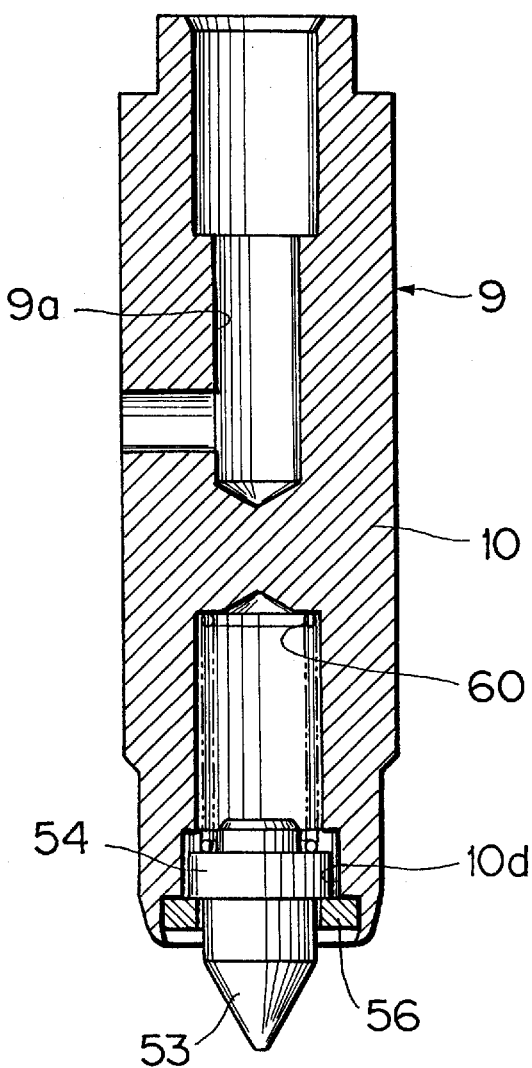
FIG. 12 is a sectional view showing other modified embodiment of a pilot valve applicable to the rotary channel-selector valve of FIG. 9.

In a modified embodiment shown in FIG. 12, a compression coil spring 60 with a predetermined load is assembled between the needle valve portion 53 and the stem portion 10.

In this modified embodiment, since the needle valve portion 53 is pushed by spring force by the compression coil spring 60, the needle valve portion 53 does not get rickety against the stem portion 10 in a valve-opened state and further, valve closing-pressure can be controlled with the compression coil spring 60.

Still further, since the compression coil spring 60 is provided between the needle valve portion 53 and the stem portion 10, a shock of a hit by the needle valve portion 53 against the valve port 55 at the time of closing the pilot valve 9 can be absorbed by the compression coil spring 60, thereby further improving durability of the needle valve portion 53 and the valve port 55 against wear or chipping or the like.

Figure 13:
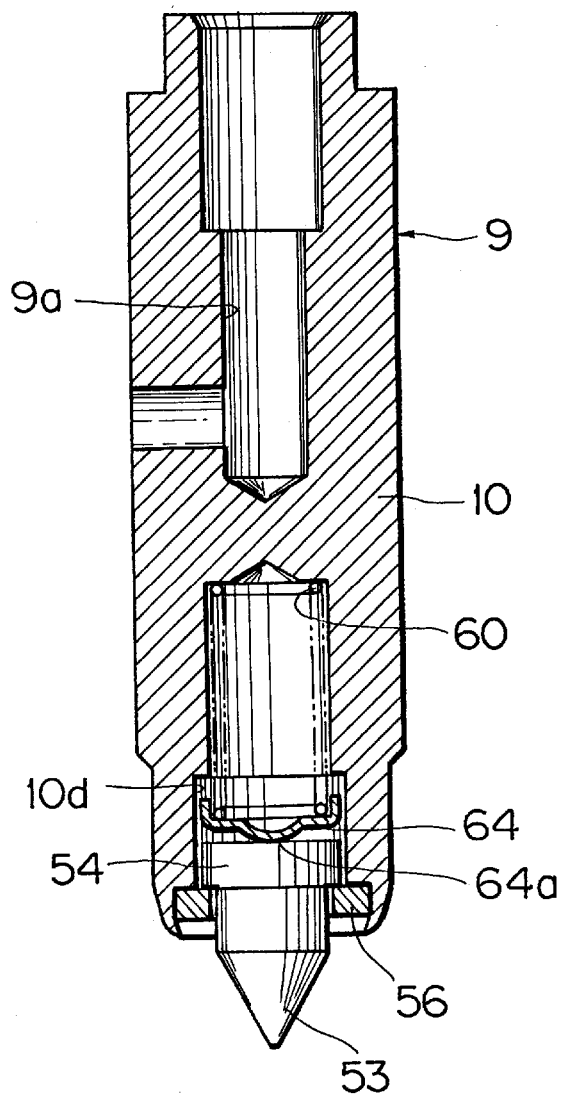
FIG. 13 is a sectional view showing other modified embodiment of a pilot valve applicable to the rotary channel-selector valve of FIG. 9.

In a modified embodiment shown in FIG. 13, a valve retainer 64 with a spherical portion 64a is provided, and the spherical portion 64a is pushed to the needle valve portion 53 by spring force by the compression coil spring 60.

With this structure, the needle valve portion 53 does not get rickety against the stem portion 10 in a valve-opened state, and valve closing-pressure can be controlled with the compression coil spring 60, and further, since the spherical portion 64a is pushed to the needle valve portion 53, the needle valve portion 53 can tilts self-aligningly against the stem portion 10 at the time of valve-closing and directional position of the needle valve portion 53 relative to the stem portion 10 can be corrected automatically.

Figure 14A:
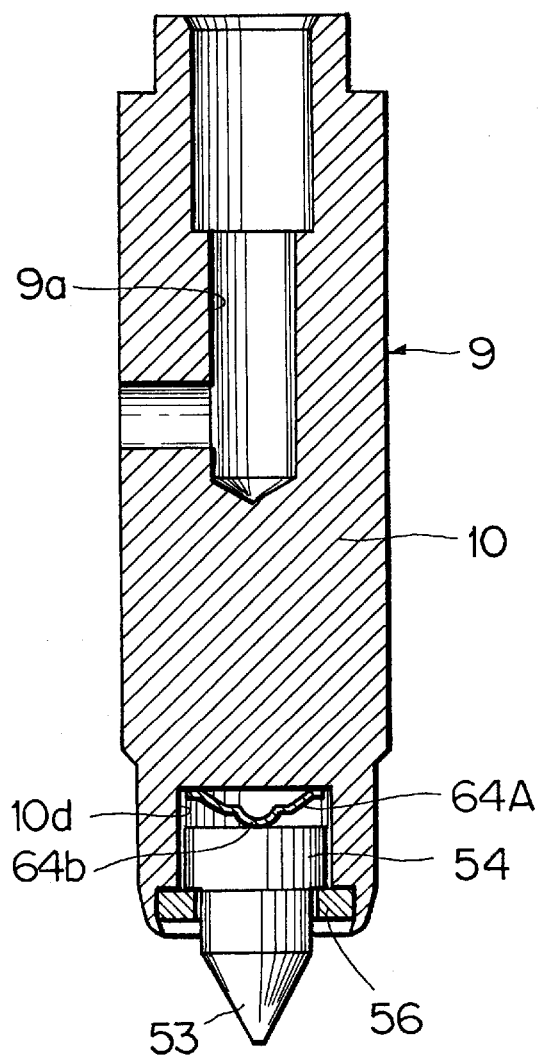
FIG. 14A is a sectional view showing other modified embodiment of a pilot valve applicable to the rotary channel-selector valve of FIG. 9.
Figure 14B:
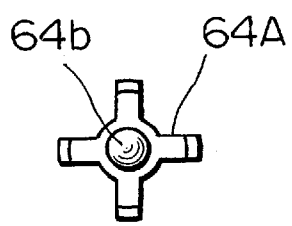
FIG. 14B is a plan view a leaf spring of FIG. 14A.

In a modified embodiment shown in FIGS. 14A and 14B, a cross-shaped leaf spring 64A, instead of the compression coil spring 60, with a spherical portion 64b in the central portion thereof is provided between the needle valve portion 53 and the stem portion 10 in a state of having a predetermined load. The leaf spring 64A abuts on the needle valve portion 53 by means of the spherical portion 64b.

With this structure, the needle valve portion 53 does not get rickety against the stem portion 10 in a valve-opened state, and valve closing-pressure can be controlled with the leaf spring 64A, and further, since the needle valve portion 53 is pushed by the spherical portion 64b, the needle valve portion 53 can tilts self-aligningly against the stem portion 10 at the time of valve-closing and directional position of the needle valve portion 53 relative to the stem portion 10 can be corrected automatically.

"specific structure of a third embodiment of a rotary channel-selector valve in accordance with the present invention"

Figure 15:
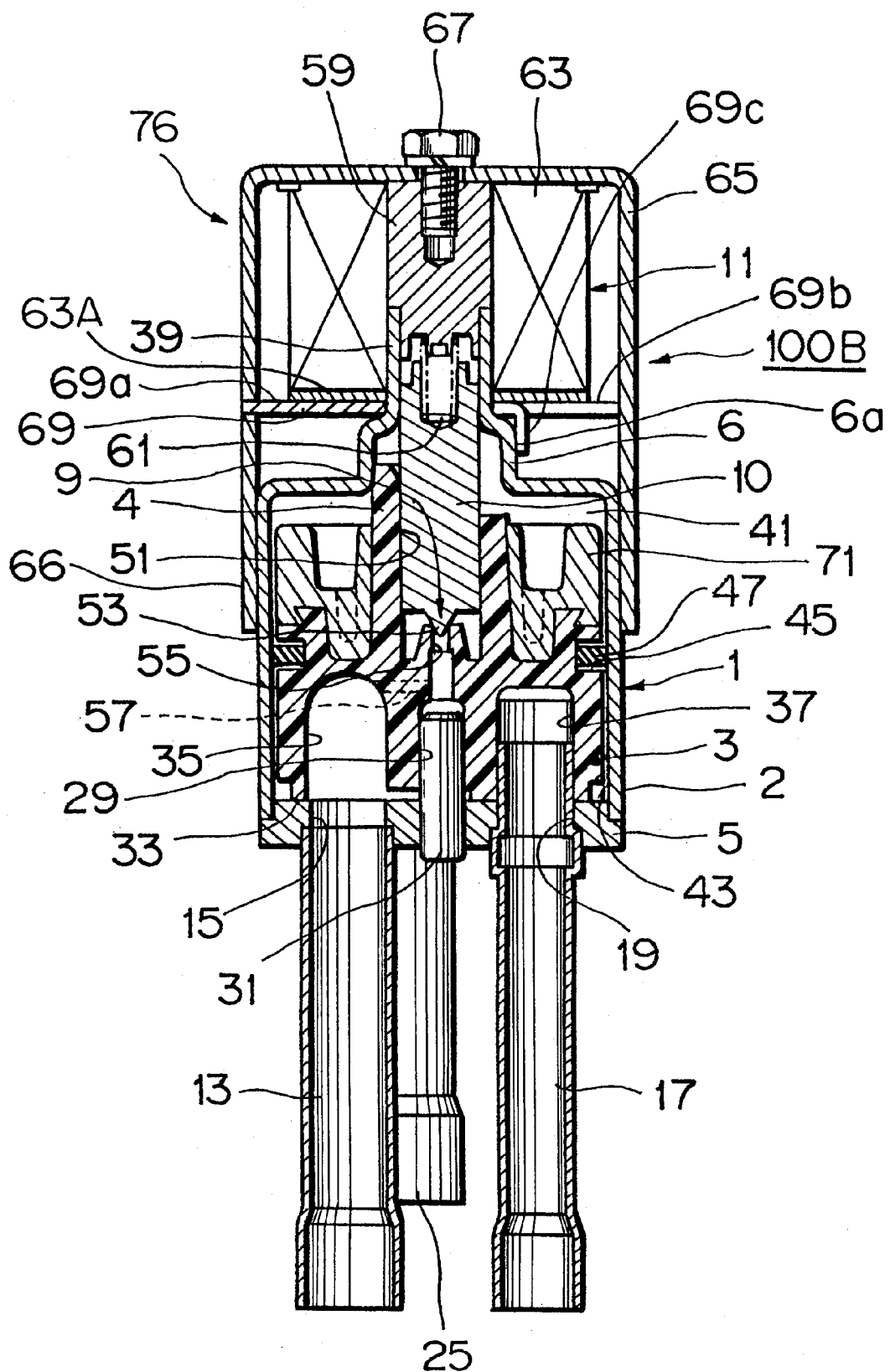
FIG. 15 is a longitudinal sectional view showing a third embodiment of a rotary channel-selector valve in accordance with the present invention.

Next, FIG. 15 shows a structure of a third embodiment of a 4-way valve, used as a channel-selector valve in a refrigerating cycle, in accordance with the present invention.

For the 4-way valve shown in FIG. 15, the same reference numerals as in FIG. 1 are allotted to the same members or portions as in FIG. 1 showing the first embodiment of a 4-way valve for a refrigerating cycle, and iterative descriptions are omitted hereinafter.

And, in the 4-way valve 100B of the third embodiment, a multipolar magnet 71 of plastic magnet is integrally provided by insert molding on top of the main valve element 3. As shown in FIG. 25, the multipolar magnet 71 is in a ring-like shape coaxially with the main valve element 3 and has a pair of the north portions 72 and another pair of the south pole portions 74 which are alternately arranged in a rotating direction.

Figure 16:
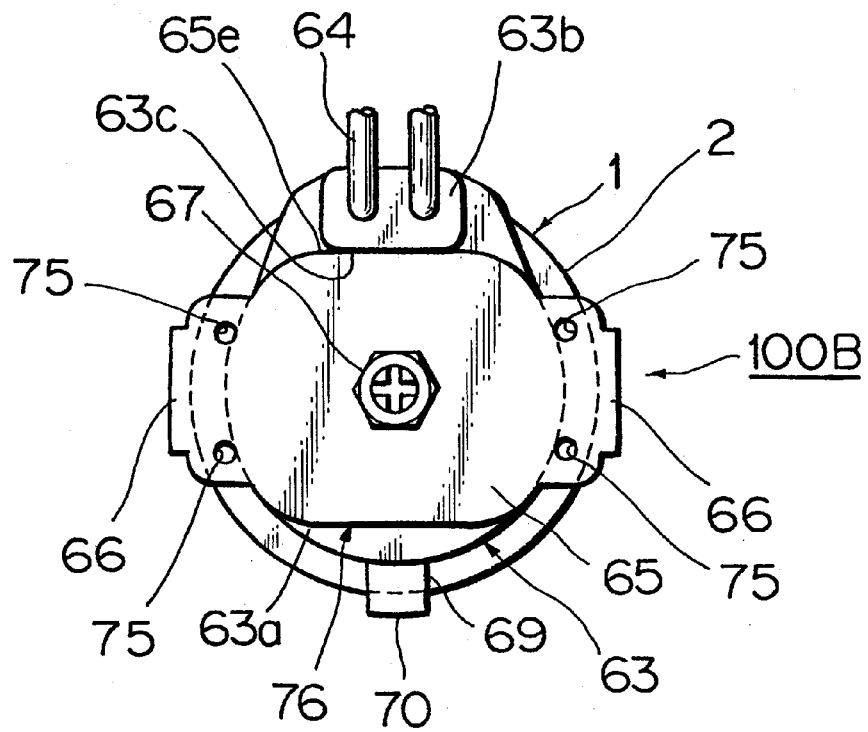
FIG. 16 is a plan view showing the rotary channel-selector valve of FIG. 15.
Figure 17:
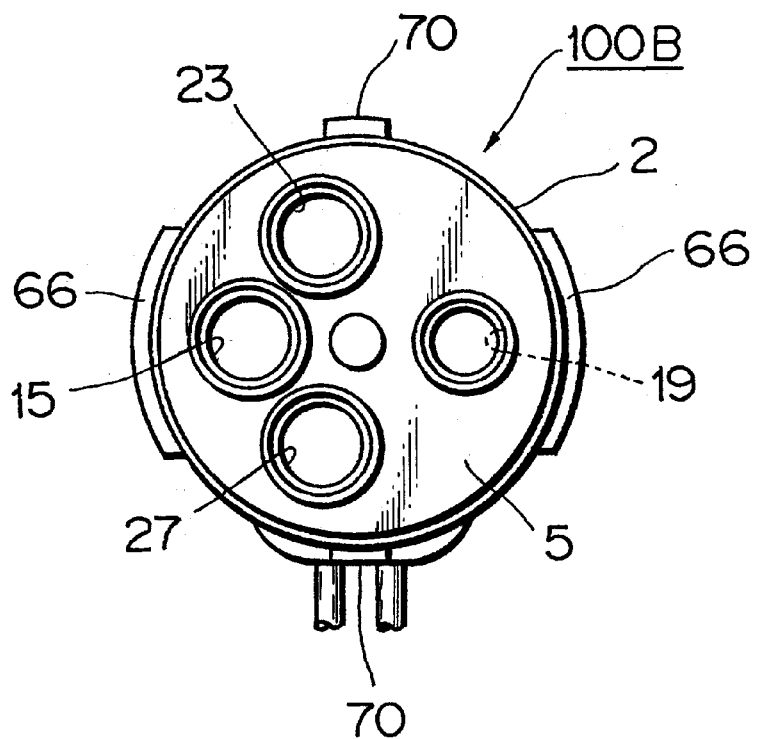
FIG. 17 is a bottom view showing the rotary channel-selector valve of FIG. 15.
Figure 18:
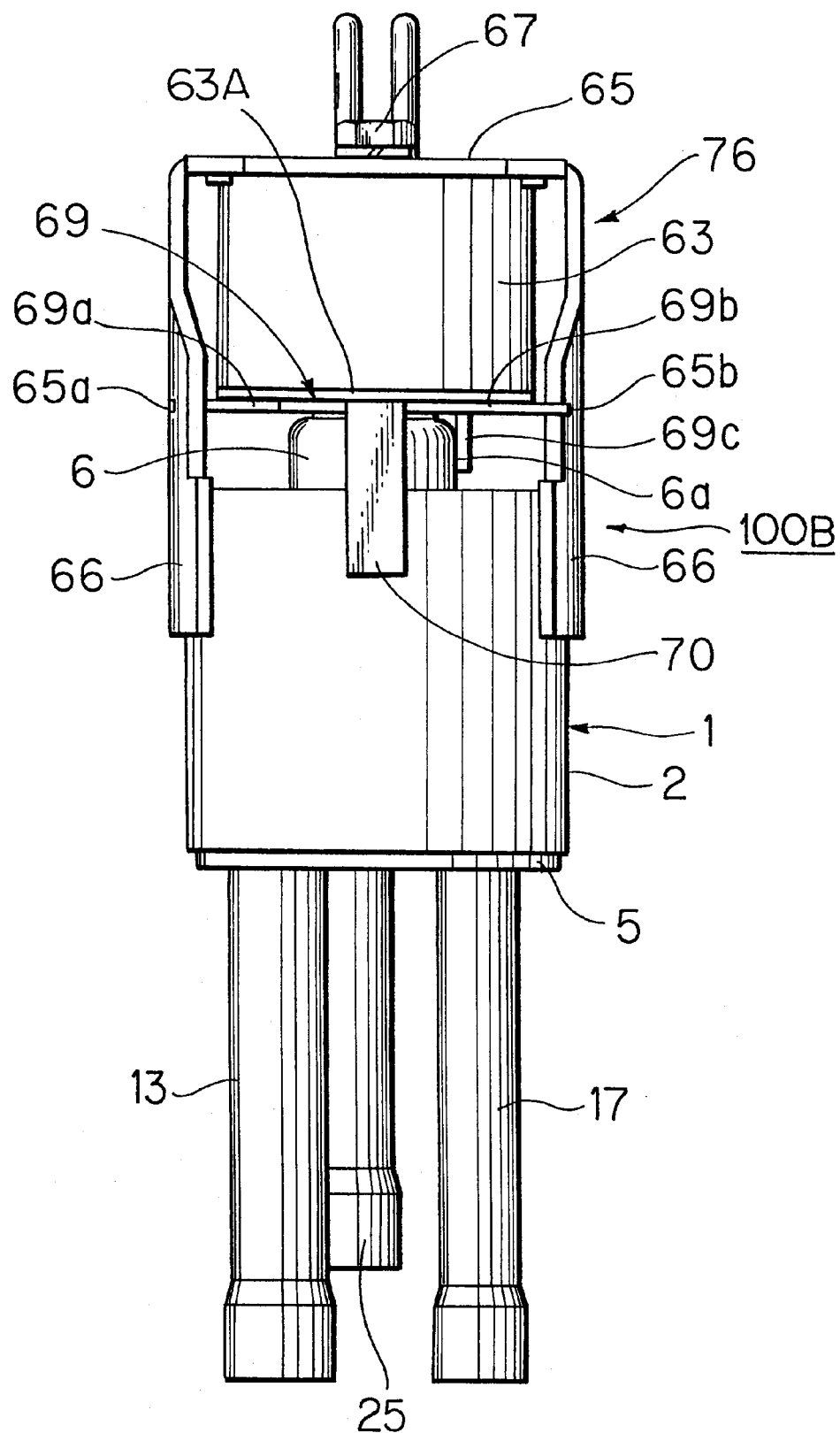
FIG. 18 is a front view showing the rotary channel-selector valve of FIG. 15.

As shown in FIG. 15, an electromagnetic coil 63 is fixed to a fixed attractor 59 being as a part of a valve housing 1 by means of a magnetic pole equipping electromagnetic coil attaching body 76. As shown in FIGS. 16,18, and 24, the magnetic pole equipping electromagnetic coil attaching body 76 has an assembled body consisting of an outer box 65, being in a staple-like shape and having a pair of main magnetic pole pieces 66 arranged with a circumferential difference by 180 degrees each other, and an under plate 69 made of a metal sheet and having a pair of minor magnetic pole pieces 70 assembled to the outer box 65 with a circumferential difference by 180 degrees each other and also with a circumferential difference by 90 degrees against the main magnetic pole pieces 66.

And, as shown in FIG. 16, a convex 75, in a concave-like shape when looked at from an outer surface side of the outer box 65, is formed on the back surface of the outer box 65 at each corner thereof. These four (4) convexes 75 engage a periphery of one end surface of a coil bobbin 63a being in a shape of a substantially oval and simultaneously a periphery 65e of the outer box 65 abuts on a side end 63c of a thick portion 63b projecting from the coil bobbin 63a at an end surface thereof for reinforcing roots of lead wires 64 drawn out of the coil bobbin 63a so as to position the electromagnetic coil 63 with respect to the outer box 65 in a rotating direction of the main valve element 3.

The outer box 65 is magnetically connected to one magnetic pole on the upper side of the electromagnetic coil 63, and an under plate 69 is magnetically connected to the other magnetic pole on the lower side of the electromagnetic coil 63. As shown in FIGS. 18 and 23, the main magnetic pole pieces 66 and the minor magnetic pole pieces 70 are put into contact with the peripheral surface of a large-diameter cylindrical portion 2 of the valve housing 1 and rotate the main valve element 3 by the magnetic action against the multipolar magnet 71. With this structure, the main magnetic pole pieces 66 face one magnetic poles of the multipolar magnet 71 through a peripheral wall of the valve housing 1, and the minor magnetic pole pieces 70 face the other magnetic poles of the multipolar magnet 71 through the peripheral wall of the valve housing 1.

Figure 19:
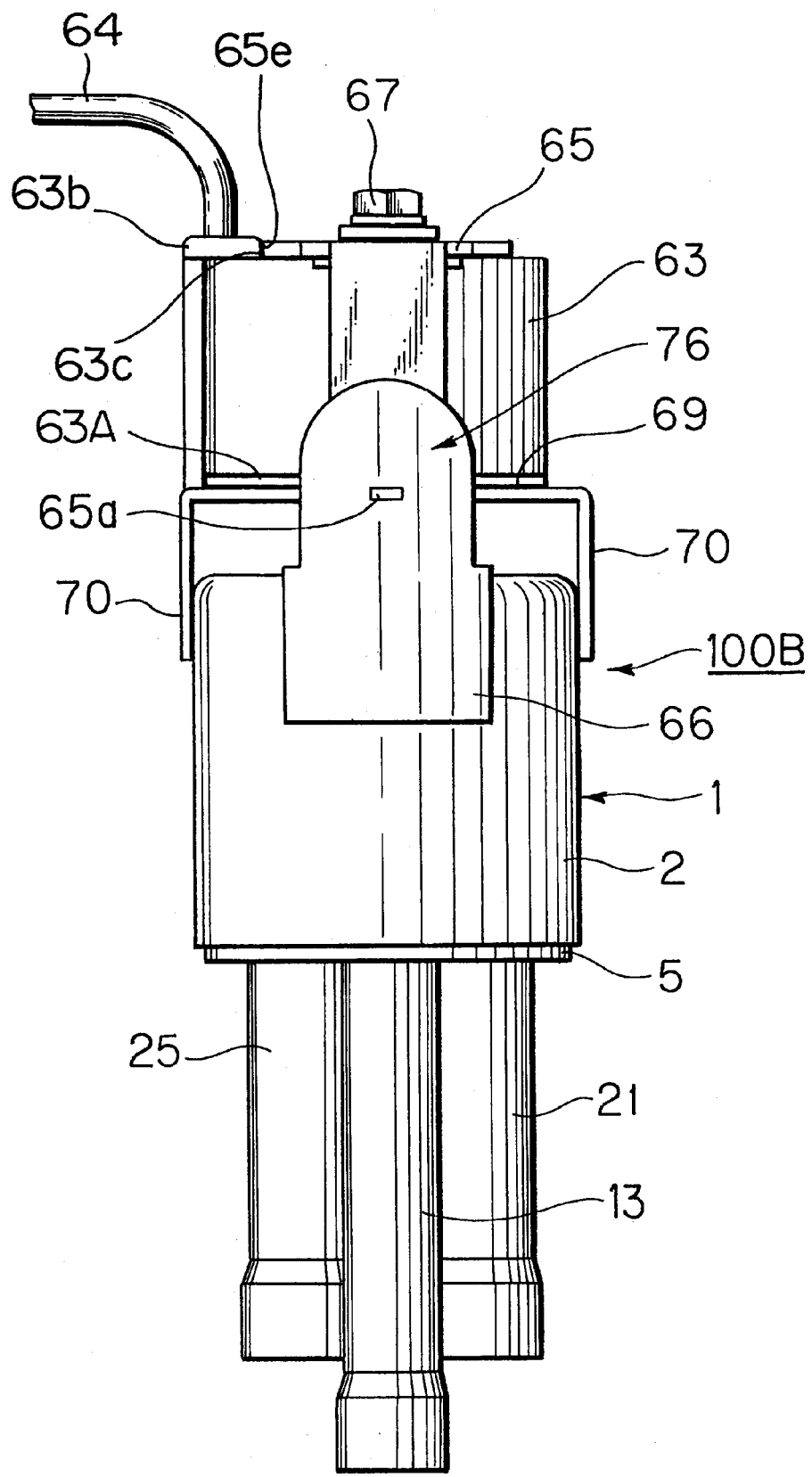
FIG. 19 is a side view showing the rotary channel-selector valve of FIG. 15.

As shown in FIG. 15, the magnetic pole equipping electromagnetic coil attaching body 76 is fixed with a bolt 67 to an upper end surface of the fixed attractor 59 through the outer box 65. The under plate 69 has connecting bridge-pieces 69a 69b extending with a circumferential difference by 90 degrees against the minor magnetic pole pieces 70 and, as shown in FIGS. 18 and 19, end portions of the respective connecting bridge-pieces 69a 69b engage respective small openings 65a 65b formed on the outer box 65, thereby positioning the under plate 69 with respect to the outer box 65. With this, relative position between the main magnetic pole pieces 66 and the minor magnetic pole pieces 70 is uniformly decided and this location-ship does not change.

A buffering sheet 63A made of an elastic material such as rubber is provided between the other end surface of the coil bobbin 63a and the connecting bridge-pieces 69a 69b of the under plate 69, and the buffering sheet 63A prevents transmission of vibration of the electromagnetic coil 63 to the under plate 69 and to the valve housing 1, which vibration of the electromagnetic coil 63 is arisen by a bump, against the fixed attractor 59, of the pilot valve 9 attracted by the fixed attractor 59 by sensing an electric current to the electromagnetic coil 63.

In the above-described electromagnetic actuator structure with an electromagnetic solenoid 11 and the multipolar magnet 71, the main magnetic pole pieces 66 are magnetized to the north pole and the minor magnetic pole pieces 70 are magnetized to the south pole, and viceversa, according to direction of current in the electromagnetic coil 63 of the electromagnetic solenoid 11.

In the 4-way valve 100B having the above-described structure, when an electric current is sent to the electromagnetic coil 63 of the electromagnetic solenoid 11 under a state shown in FIG. 15, the fixed attractor 59 is excited and the pilot valve 9 is attracted by the fixed attractor 59 and moved upward against spring force by a spring 61, and then a valve port 55 opens.

Accordingly, a pressure chamber 41 communicates with a low pressure connecting groove 35 and a low pressure port 15, and internal pressure of the pressure chamber 41 goes down from high pressure of a high pressure port 19 to low pressure of the low pressure port 15. Consequently, the upper side of the main valve element 3 suffers lower pressure than the lower side of the main valve element 3, and the main valve element 3 rises by this pressure difference, separates from a valve-seat plate 5, and becomes in a state of being capable of rotating with low resistance.

Figure 25A:
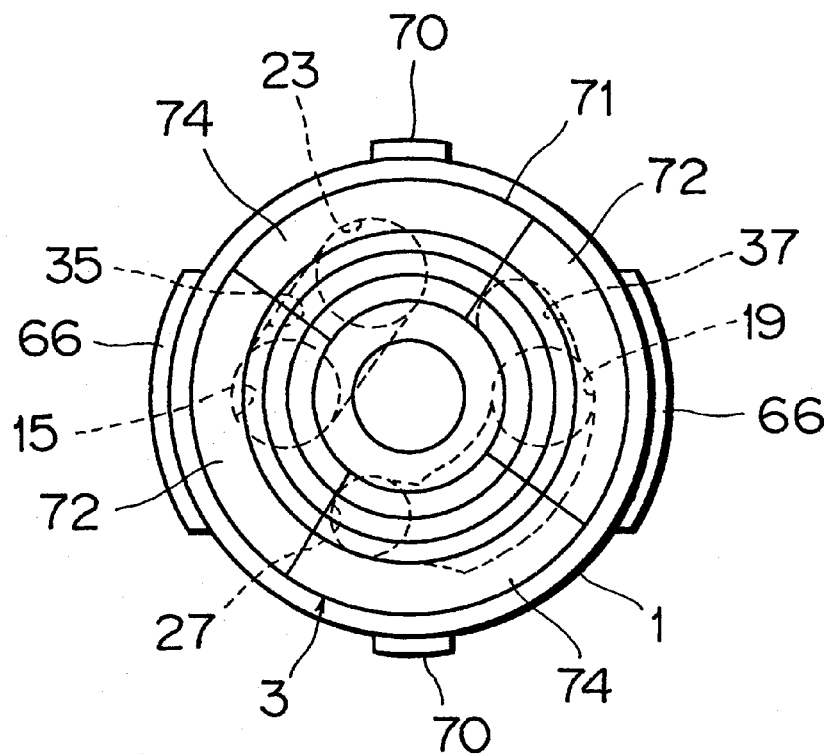
FIGS. 25A and 25B are sectional views each showing an electromagnetic actuator portion of the rotary channel-selector valve of FIG. 15.
Figure 25B:
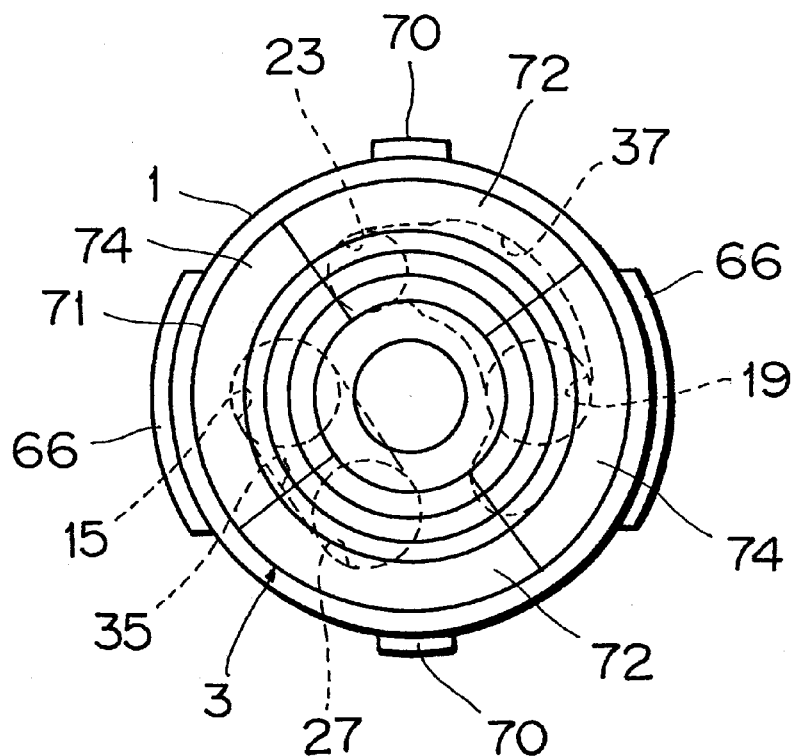

In the state described above, by the magnetic repulsion between the main magnetic pole pieces 66 magnetized to the north pole by sending an electric current to the electromagnetic coil 63 and the north portions 72 of the multipolar magnet 71 and also by the magnetic repulsion between the minor magnetic pole pieces 70 magnetized to the south pole by sending an electric current to the electromagnetic coil 63 and the south portions 74 of the multipolar magnet 71, the main valve element 3 rotates in a counterclockwise sense in FIGS. 5 and 6 and shifts from the first channel-switching position shown (shown in FIGS. 5 and 25A) to the second channel-switching position (shown in FIGS. 6 and 25B).

Consequently, the south pole portions 74 of the multipolar magnet 71 are attracted, with a face to face arrangement, to the main magnetic pole pieces 66 magnetized to the north pole and the north pole portions 72 of the multipolar magnet 71 are attracted, with a face to face arrangement, to the minor magnetic pole pieces 70 magnetized to the south pole, thereby holding the main valve element 3 at the second channel-switching position and the heat pump cycle is switched from the cooling mode to the heating mode.

By stopping sending an electric current to the electromagnetic coil 63, the pair of the main magnetic pole pieces 66 merely as metal with no magnetic pole are attracted by the south pole portions 74 of the multipolar magnet 71 and the minor magnetic pole pieces 70 merely as metal with no magnetic pole are attracted by the north pole portions 72 of the multipolar magnet 71, and the main valve element 3 is held at the second channel-switching position.

Along with stopping sending an electric current to the electromagnetic coil 63, the pilot valve 9 drops by spring force by the spring 61 and closes, thereby shutting off the communication between the pressure chamber 41 and the low pressure connecting groove 35, and then pressure of a high pressure connecting groove 37, i.e. of the high pressure port 19, is introduced into the pressure chamber 41 through a bypass clearance 43 and a communicating clearance of a piston ring 47, whereby pressure in the pressure chamber 41 becomes the same pressure as in a space under the main valve element 3. Consequently, the main valve element 3 returns to the original dropped position by spring force by the spring 61 and by an own weight and comes into close contact with the valve-seat plate 5 and is kept stable at the second channel-switching position (i.e. position of channel-switching completion), with high reliability of movement.

In case that the heat pump cycle is switched from the heating mode to the cooling mode, direction of an electric current to the electromagnetic solenoid 11 is reversed, and the main valve element 3 is raised upward by opening the pilot valve 9, and simultaneously the main magnetic pole pieces 66 and the minor magnetic pole pieces 70 are magnetized to the south pole and to the north pole, respectively.

In the state described above, by the magnetic repulsion between the main magnetic pole pieces 66 magnetized to the south pole by sending an electric current to the electromagnetic coil 63 and the south portions 74 of the multipolar magnet 71 and also by the magnetic repulsion between the minor magnetic pole pieces 70 magnetized to the north pole by sending an electric current to the electromagnetic coil 63 and the north portions 72 of the multipolar magnet 71, the main valve element 3 rotates in a clockwise sense in FIGS. 5 and 6 and shifts from the second channel-switching position shown (shown in FIGS. 6 and 25B) to the first channel-switching position (shown in FIGS. 5 and 25A).

Consequently, the south pole portions 74 of the multipolar magnet 71 are attracted, with a face to face arrangement, to the main magnetic pole pieces 66 magnetized to the north pole and the north pole portions 72 of the multipolar magnet 71 are attracted, with a face to face arrangement, to the minor magnetic pole pieces 70 magnetized to the south pole, thereby holding the main valve element 3 at the first channel-switching position and the heat pump cycle is switched from the heating mode to the cooling mode.

By stopping sending an electric current to the electromagnetic coil 63, the pair of the main magnetic pole pieces 66 merely as metal with no magnetic pole are attracted by the south pole portions 72 of the multipolar magnet 71 and the minor magnetic pole pieces 70 merely as metal with no magnetic pole are attracted by the north pole portions 74 of the multipolar magnet 71, and the main valve element 3 is held at the first channel-switching position.

Along with stopping sending an electric current to the electromagnetic coil 63, the pilot valve 9 drops by spring force by the spring 61 and closes, thereby shutting off the communication between the pressure chamber 41 and the low pressure connecting groove 35, and then pressure of the high pressure connecting groove 37, i.e. of the high pressure port 19, is introduced into the pressure chamber 41 through the bypass clearance 43 and the communicating clearance of a piston ring 47, whereby pressure in the pressure chamber 41 becomes the same pressure as in a space under the main valve element 3. Consequently, the main valve element 3 returns to the original dropped position by spring force by the spring 61 and by an own weight and comes into close contact with the valve-seat plate 5 and is kept stable at the first channel-switching position (i.e. position of channel-switching completion), with high reliability of movement.

Figure 20:
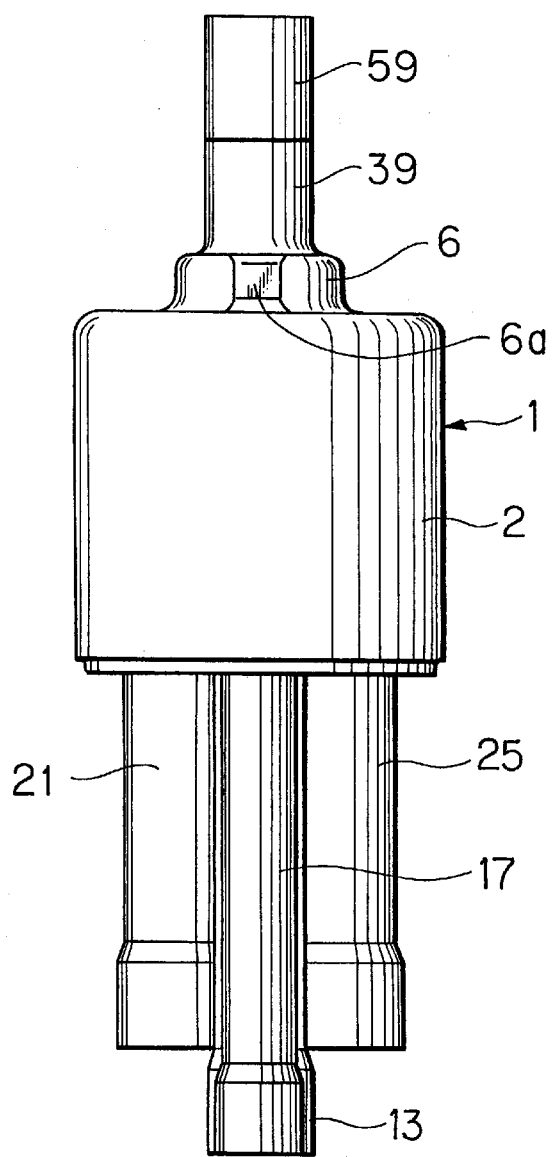
FIG. 20 is a side view showing an assembled body made up of a valve housing and a fixed attractor of the rotary channel-selector valve of FIG. 15.
Figure 21:
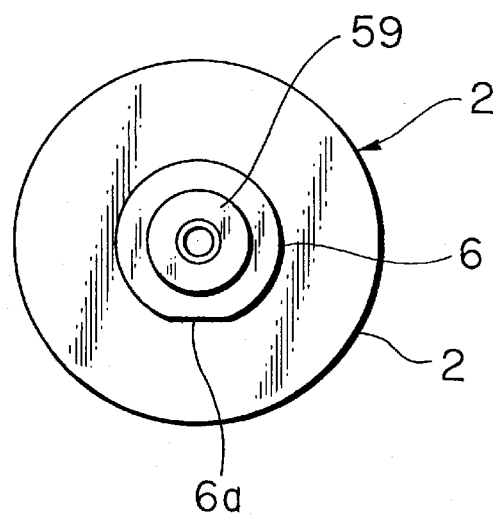
FIG. 21 is a plan view showing an assembled body made up of a valve housing and a fixed attractor of the rotary channel-selector valve of FIG. 15.
Figure 22:
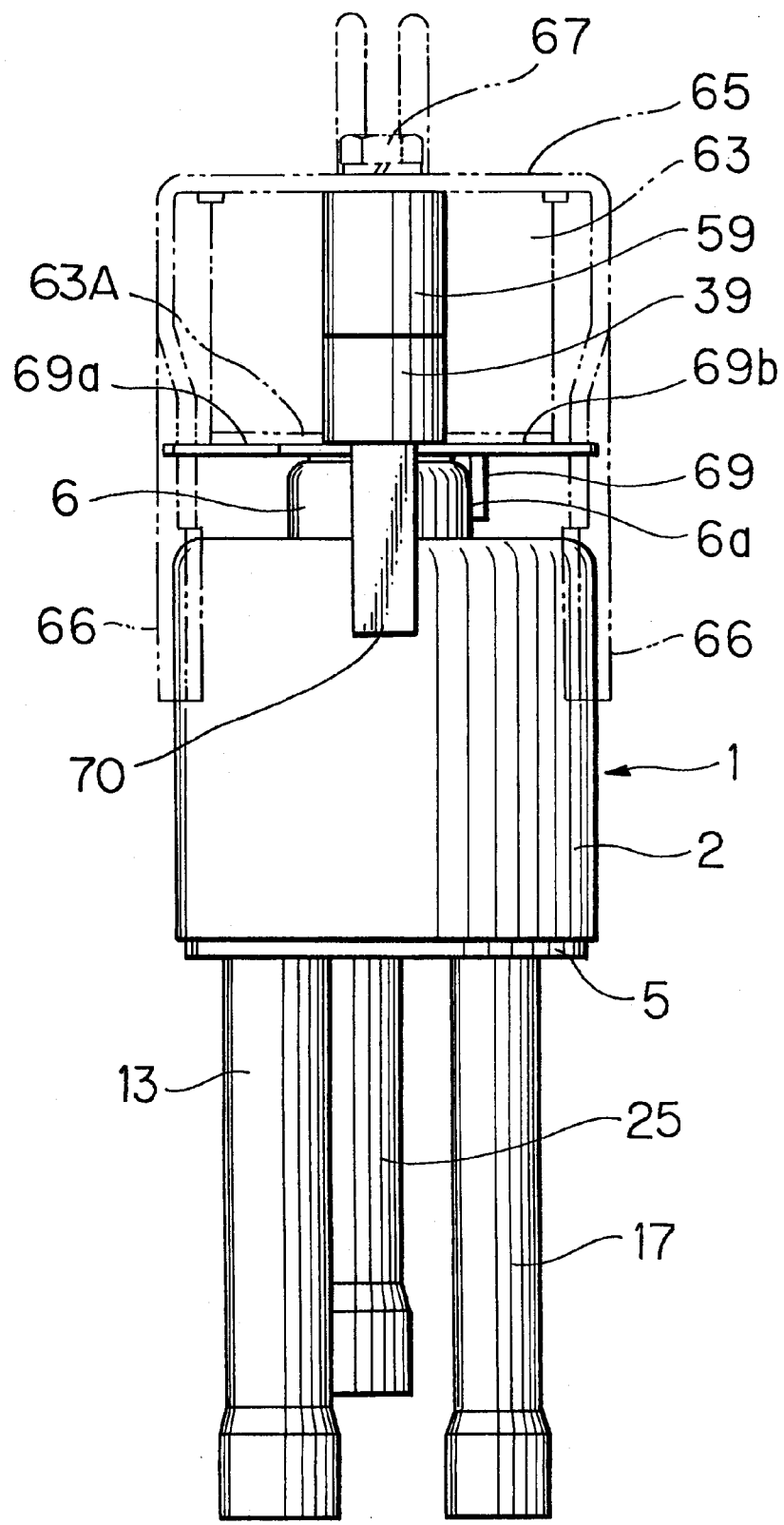
FIG. 22 is a front view showing an assembled body made up of a valve housing, a fixed attractor, and an under plate of the rotary channel-selector valve of FIG. 15.

As shown in FIG. 18, the 4-way valve 100B of the third embodiment is provided with a downwardly bent whirl-stopping piece 69c on an under plate 69. As shown in FIG. 20, a flat surface 6a is partially formed by pressing on the peripheral surface of a main valve element guide-tube 6 of the valve housing 1, and as shown in FIG. 18 the magnetic pole equipping electromagnetic coil attaching body 76 is circumferentially positioned on the valve housing 1 by a surface-engagement between the flat surface 6a and the whirl-stopping piece 69c.

Accordingly, the main magnetic pole pieces 66 and the minor magnetic pole pieces 70 are positioned at the circumferential positions required for rotating the main valve element 3 between the predetermined channel-switching positions.

"specific structure of a fourth embodiment of a rotary channel-selector valve in accordance with the present invention"

Next, FIGS. 26 to 31 show a structure of a fourth embodiment of a 4-way valve, used as a channel-selector valve in a refrigerating cycle, in accordance with the present invention.

For the 4-way valve shown in FIGS. 26 to 31, the same reference numerals as in FIGS. 15 to 25 are allotted to the same members or portions as in FIGS. 15 to 25 showing the third embodiment of a 4-way valve for a refrigerating cycle, and iterative descriptions are omitted hereinafter.

Figure 29:
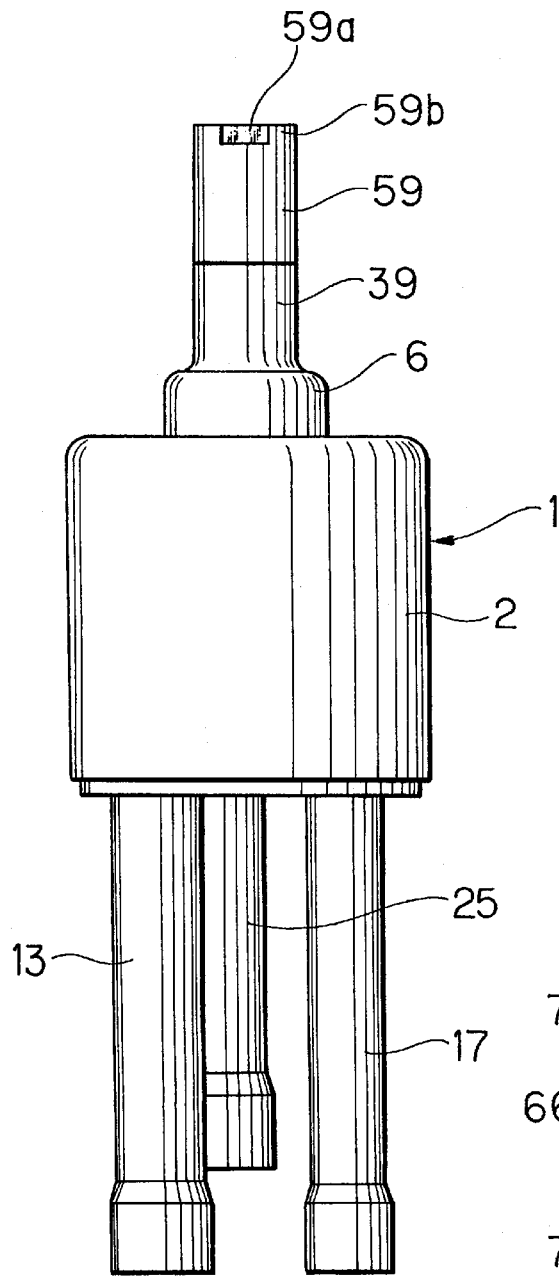
FIG. 29 is a front view showing an assembled body made up of a valve housing and a fixed attractor of the rotary channel-selector valve of FIG. 26.
Figure 28:
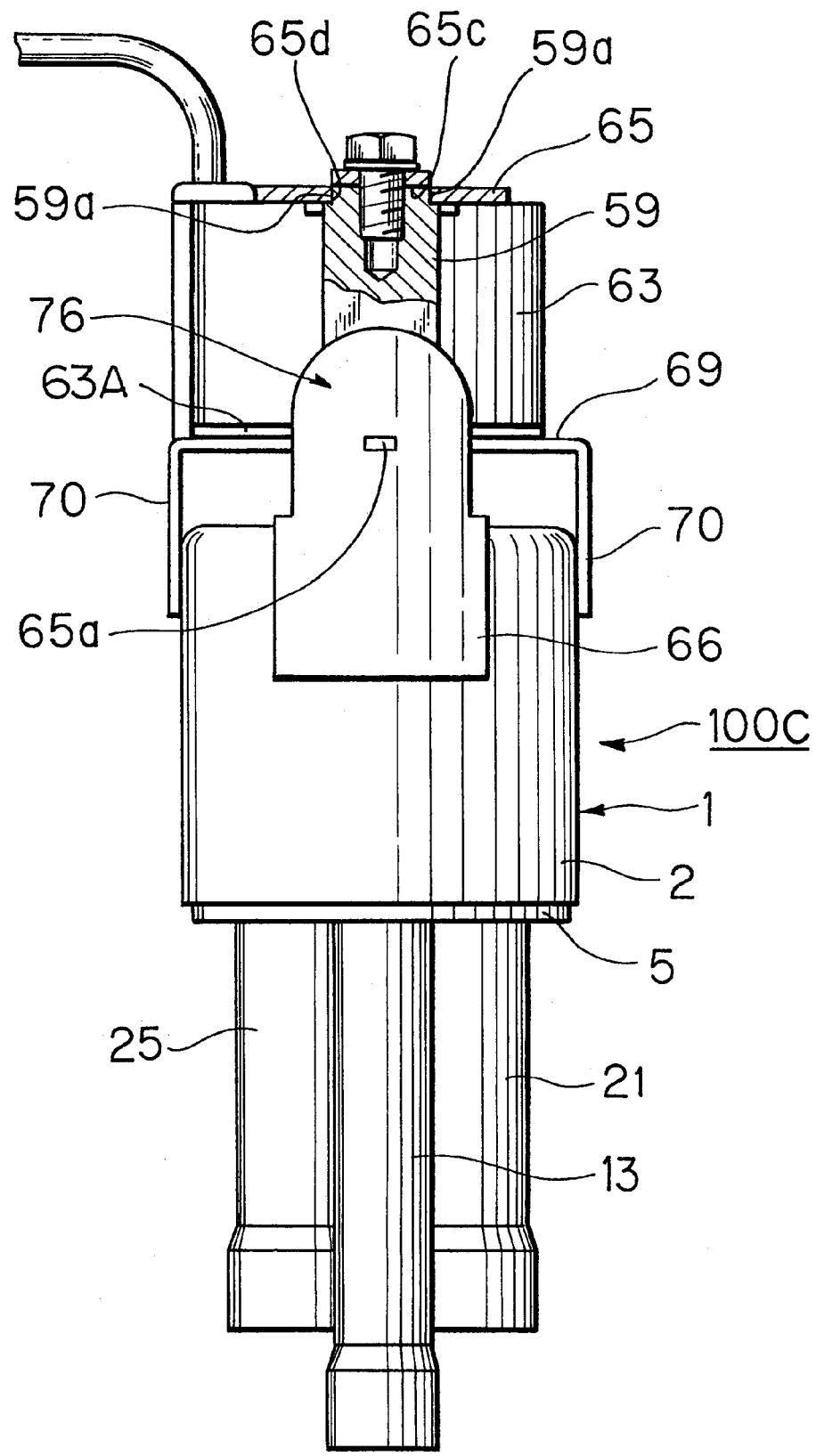
FIG. 28 is a side view, partly in section, showing the rotary channel-selector valve of FIG. 26.
Figure 31:
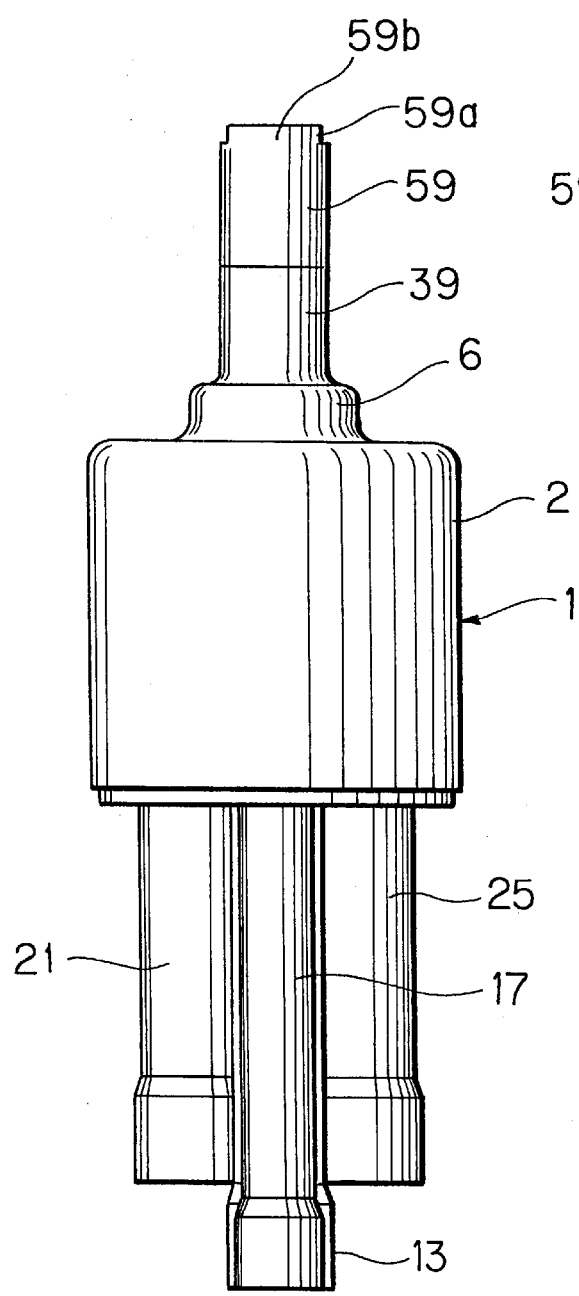
FIG. 31 is a side view showing an assembled body made up of a valve housing and a fixed attractor of the rotary channel-selector valve of FIG. 26.
Figure 30:
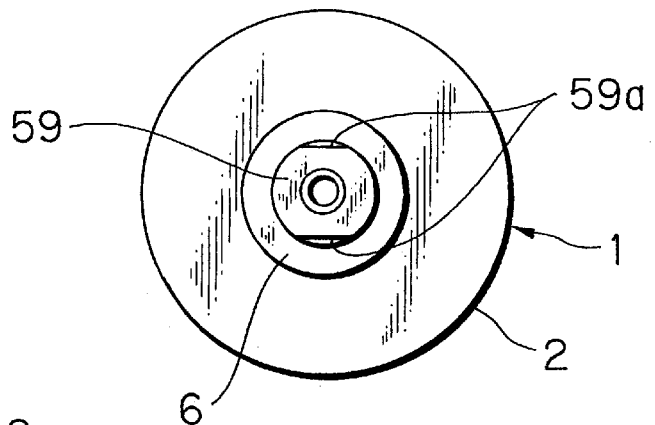
FIG. 30 is a plan view showing an assembled body made up of a valve housing and a fixed attractor of the rotary channel-selector valve of FIG. 26.

And, in the 4-way valve 100C of the fourth embodiment, as shown in FIGS. 28 to 30, a mounting engagement portion 59b with flat side-surfaces 59a is formed by two-plane machining at an upper end portion of a fixed attractor 59.

Figure 26:
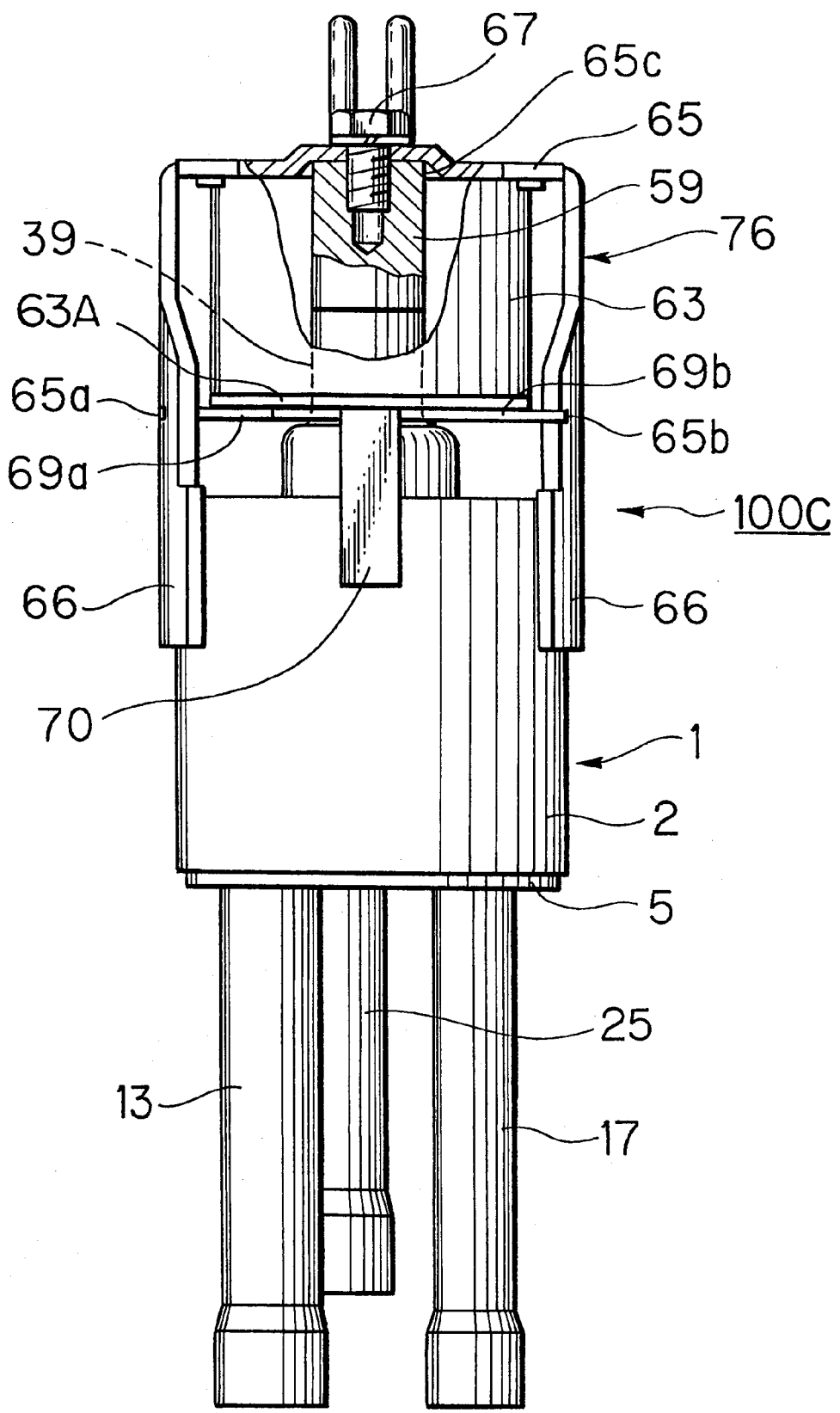
FIG. 26 is a front view, partly in section, showing a fourth embodiment of a rotary channel-selector valve in accordance with the present invention.
Figure 27:
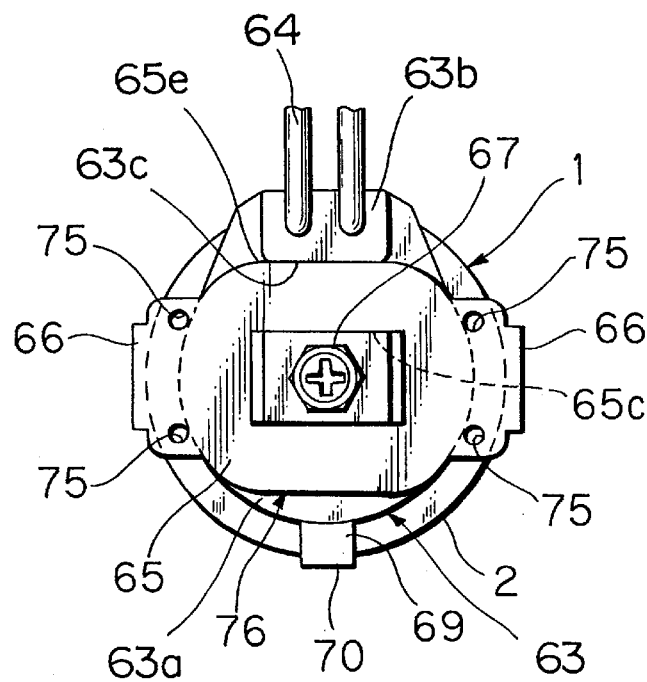
FIG. 27 is a plan view showing the rotary channel-selector valve of FIG. 26.

As shown in FIGS. 26 and 27, a concave 65c is formed by louver-pressing work on a top surface of an outer box 65 of a magnetic pole equipping electromagnetic coil attaching body 76. The concave 65c is in a rectangular shape as shown in FIG. 27 and has parallel edges 65d formed by two-plane machining and exactly engaging the flat side-surfaces 59a as shown in FIG. 28.

With an engagement between the concave 65c and the mounting engagement portion 59b in an exactly engaged state of the parallel edges 65d of the concave 65c of the outer box 65 with the flat side-surfaces 59a, a magnetic pole equipping electromagnetic coil attaching body 76 is circumferentially positioned on a valve housing 1.

Accordingly, a main magnetic pole pieces 66 and a minor magnetic pole pieces 70 are positioned at the circumferential positions required for rotating a main valve element 3 between predetermined channel-switching positions.

"specific structure of a fifth embodiment of a rotary channel-selector valve in accordance with the present invention"

Figure 34:
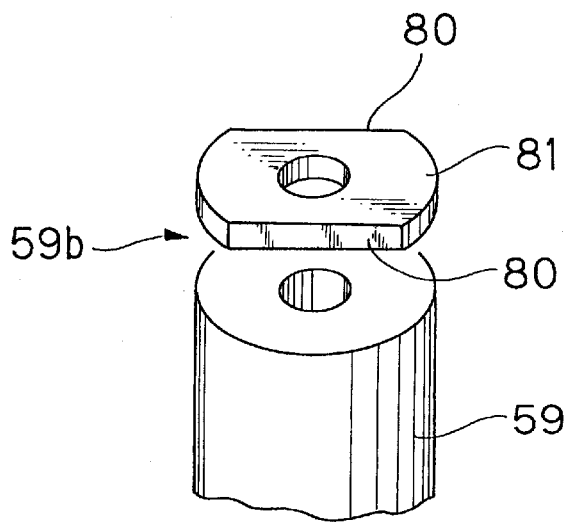
FIG. 34 is a perspective view showing a mounting state between a positioning plate and a fixed attractor of the rotary channel-selector valve of FIG. 32.
Figure 32:
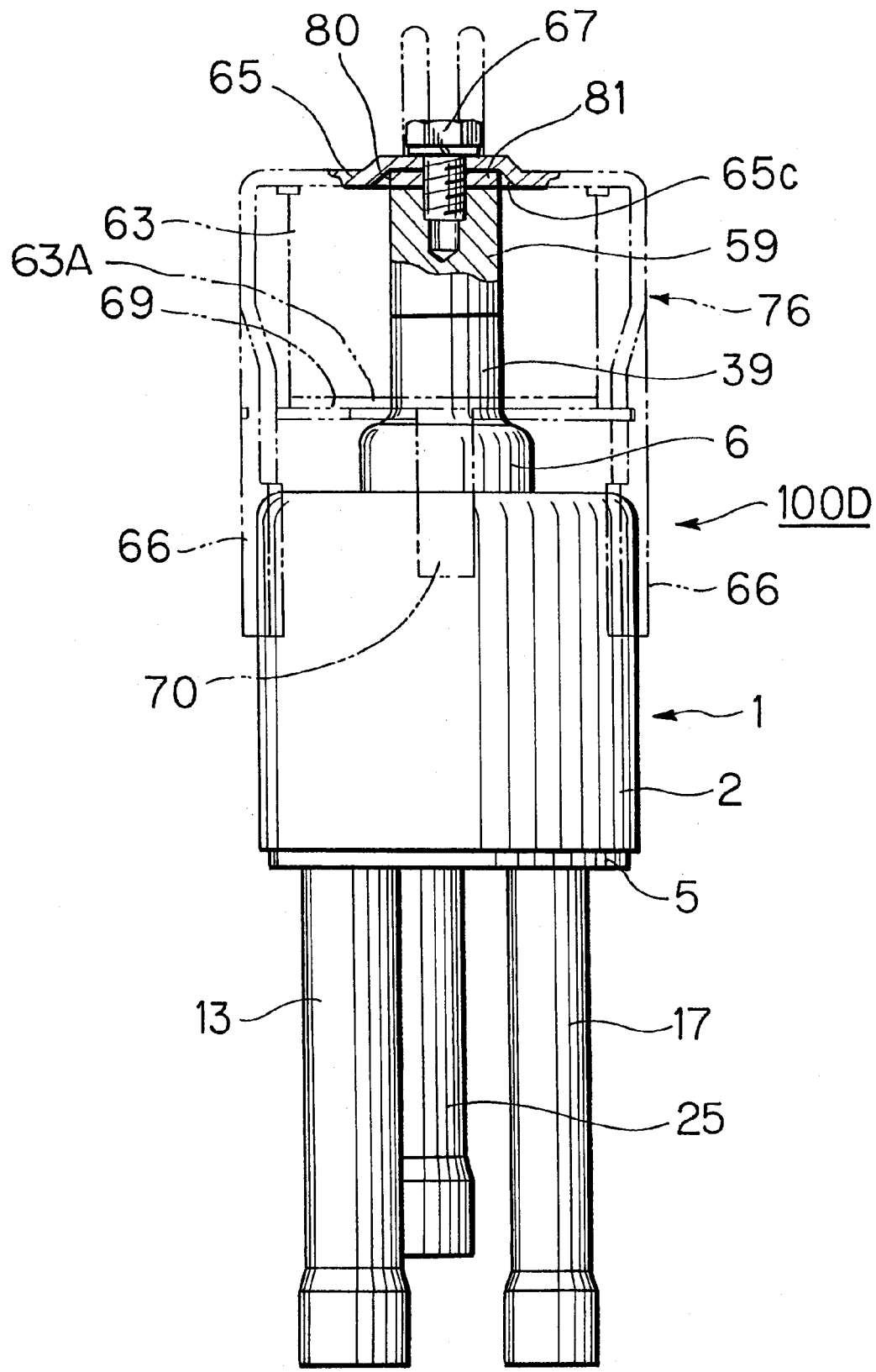
FIG. 32 is a front view showing an assembled body made up of a valve housing and a fixed attractor of a fifth embodiment of a rotary channel-selector valve in accordance with the present invention.
Figure 33:
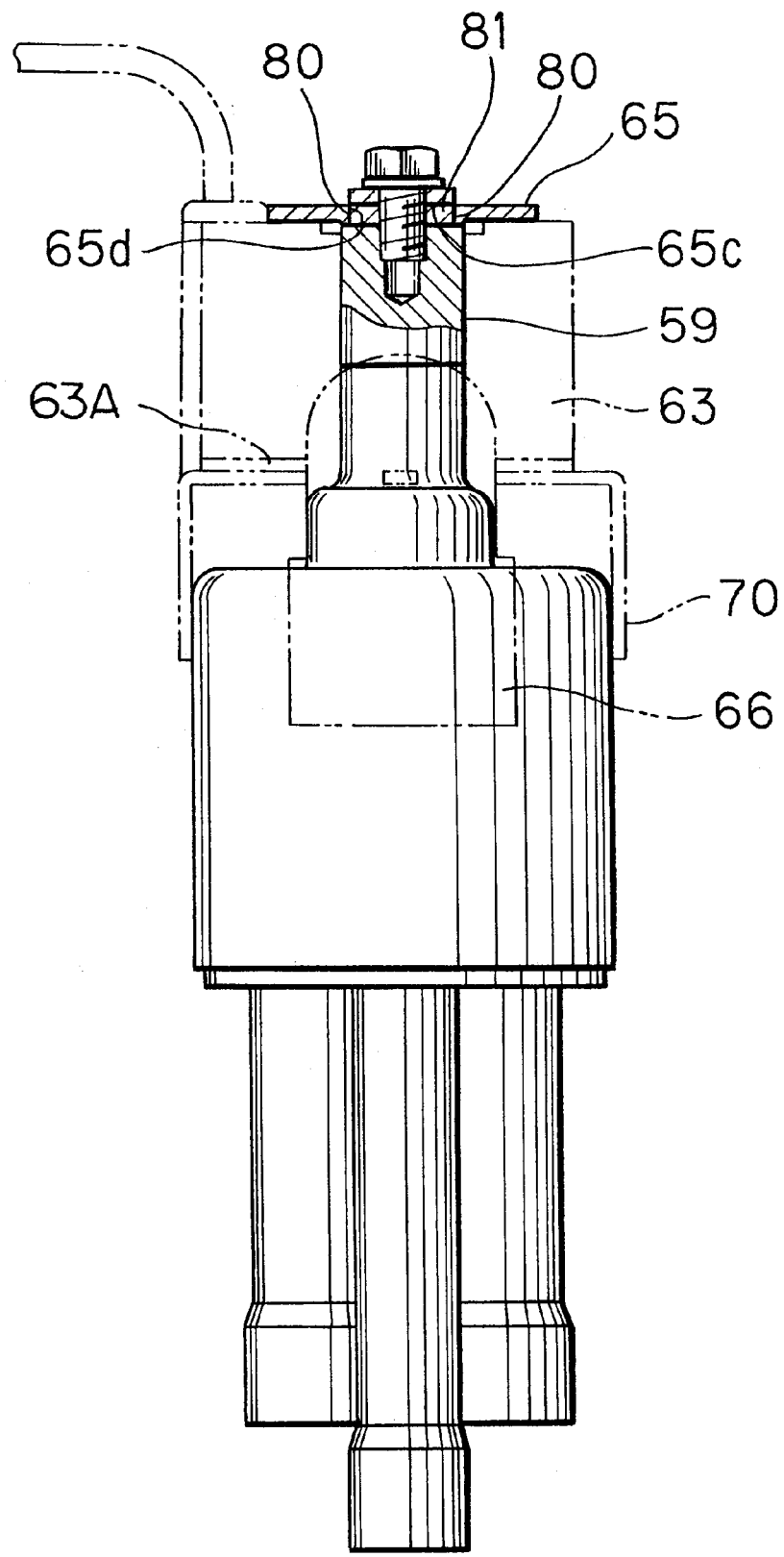
FIG. 33 is a side view showing an assembled body made up of a valve housing, a fixed attractor, and an outer box of the rotary channel-selector valve of FIG. 32.

Next, FIGS. 32 to 34 show a structure of a fifth embodiment of a 4-way valve, used as a channel-selector valve in a refrigerating cycle, in accordance with the present invention.

For the 4-way valve shown in FIGS. 32 to 34, the same reference numerals as in FIGS. 26 to 31 are allotted to the same members or portions as in FIGS. 26 to 31 showing the fourth embodiment of a 4-way valve for a refrigerating cycle, and iterative descriptions are omitted hereinafter.

And, though the mounting engagement portion 59b with flat side-surfaces 59a is directly formed two-plane machining at the upper end portion of the fixed attractor 59 in the above-described fourth embodiment, another mounting engagement portion 59b is formed by fixing a positioning plate 81 with flat side-surfaces 80 on the top end of a fixed attractor 59 by means of welding or the like in the 4-way valve 100D of the fifth embodiment shown in FIGS. 32 to 34.

In this case, the mounting engagement portion 59b may be in a shape of a polygon such as a square or a pentagon, without being limited to the two-plane machining shape.

Further, though embodiments and the modified embodiments of a 4-way valve are described hereinbefore, the present invention is also applicable to a rotary 3-way valve and further applicable to a rotary channel-selector valve wherein a main valve element rotates with keeping in contact with a valve-seat plate, besides the rotary channel-selector valve with the pilot valve wherein the main valve element 3 becomes apart from the valve-seat plate 5 during rotation as in the above-mentioned embodiments.

What is claimed is:

1. A rotary channel-selector valve, comprising:

a valve housing;

a main valve element accommodated in the valve housing, being capable of rotating between a first channel-switching position and a second channel-switching position, and having high and low pressure connecting grooves isolated from each other on one end surface thereof;

a valve-seat plate, fixed to the valve housing, facing the one end surface of the main valve element, and having high and low pressure ports and first and second switching ports, wherein a connecting point of the high pressure port shifts from one of the first and second switching ports to the other thereof through the high pressure connecting groove by rotating the main valve element between the first and second channel-switching positions and simultaneously a connecting point of the low pressure port shifts from the other of the first and second switching ports to the one thereof through the low pressure connecting groove, and rotation of the main valve element between the first and second channel-switching positions is performed with the one end surface of the main valve element being apart from the valve-seat plate;

a first high pressure fluid jetting groove formed on the one end surface of the main valve element, wherein one end portion, of the high pressure connecting groove, positioned near the high pressure port at the first channel-switching position opens to a periphery of the main valve element through the first high pressure fluid jetting groove;

a second high pressure fluid jetting groove formed on the one end surface of the main valve element and being isolated from the first high pressure fluid jetting groove, wherein another end portion, of the high pressure connecting groove, positioned near the high pressure port at the second channel-switching position opens to the periphery of the main valve element through the second high pressure fluid jetting groove; and a bulkhead being in a shape of a projecting strip and provided on a bottom surface of the high pressure connecting groove, wherein since high pressure fluid jetting from the high pressure port to the high pressure connecting groove flows easier toward the first high pressure fluid jetting groove than toward the second high pressure fluid jetting groove by an action of the bulkhead in a state that the high pressure port positions nearer one end portion of the high pressure connecting groove than the bulkhead, power of a first high pressure flow jetting from the first high pressure fluid jetting groove to the periphery of the main valve element wins power of a second high pressure flow jetting from the second high pressure fluid jetting groove to the periphery of the main valve element and rotating force in a direction from the second channel-switching position to the first channel-switching position acts on the main valve element due to difference of power between the first high pressure flow and the second high pressure flow, and, on the contrary, since high pressure fluid jetting from the high pressure port to the high pressure connecting groove flows easier toward the second high pressure fluid jetting groove than toward the first high pressure fluid jetting groove by an action of the bulkhead in a state that the high pressure port positions nearer another end portion of the high pressure connecting groove than the bulkhead, power of a second high pressure flow jetting from the second high pressure fluid jetting groove to the periphery of the main valve element wins power of a first high pressure flow jetting from the first high pressure fluid jetting groove to the periphery of the main valve element and rotating force in a direction from the first channel-switching position to the second channel-switching position acts on the main valve element due to difference of power between the first high pressure flow and the second high pressure flow.

2. The rotary channel-selector valve as claimed in claim 1, further comprising:

a valve outside-passage formed between an inner surface of the valve housing and the periphery of the main valve element and communicating with the high pressure port;

a pressure chamber formed between another end surface of the main valve element and the valve housing and communicating with the valve outside-passage;

a gate portion formed on one end surface of the main valve element and opening the high pressure connecting groove to the periphery of the main valve element;

a pilot passage formed in the main valve element and connecting the low pressure connecting groove to the pressure chamber, permitting larger flow than that of the valve outside-passage; and a pilot valve provided in the valve housing, wherein the main valve element is pushed to the valve-seat plate by the high pressure fluid flowing into the pressure chamber through the gate portion and the valve outside-passage after jetting from the high pressure port to the high pressure connecting groove by closing the pilot passage provided in the valve housing by the pilot valve and, on the contrary, the main valve element separates from the valve-seat plate by disappearance of force pushing the main valve element toward the valve-seat plate by drop of pressure in the pressure chamber by opening the pilot passage by the pilot valve, and the first high pressure fluid jetting groove and the second high pressure fluid jetting groove each have a larger cross-section than that of the gate portion and, therefore, power of the first high pressure flow wins that of a third high pressure flow jetting from the high pressure connecting groove to the periphery of the main valve element through the gate portion in a state that the high pressure port positions nearer one end portion of the high pressure connecting groove than the bulkhead and, on the contrary, power of the second high pressure flow wins that of the third high pressure flow jetting from the high pressure connecting groove to the periphery of the main valve element through the gate portion in a state that the high pressure port positions nearer another end portion of the high pressure connecting groove than the bulkhead.

* * * * *